United States Patent
Buchner et al.

(10) Patent No.: US 8,218,774 B2
(45) Date of Patent: Jul. 10, 2012

(54) APPARATUS AND METHOD FOR PROCESSING CONTINUOUS WAVE FIELDS PROPAGATED IN A ROOM

(75) Inventors: Herbert Buchner, Nittendorf (DE); Wolfgang Herbodt, Volkach (DE); Sascha Spors, Nuremberg (DE); Walter Kellermann, Eckental (DE)

(73) Assignees: Herbert Buchner, Nittendorf (DE); Wolfgang Herbodt, Volkach (DE); Sascha Spors, Nuremberg (DE); Walter Kellerman, Eckental (DE)

( * ) Notice: Subject to any disclaimer, the term of this patent is extended or adjusted under 35 U.S.C. 154(b) by 1745 days.

(21) Appl. No.: 11/381,678

(22) Filed: May 4, 2006

(65) Prior Publication Data
US 2006/0262939 A1     Nov. 23, 2006

Related U.S. Application Data

(63) Continuation of application No. PCT/EP2004/012570, filed on Nov. 5, 2004.

(30) Foreign Application Priority Data

Nov. 6, 2003 (DE) .................. 103 51 793

(51) Int. Cl.
*H04R 5/00* (2006.01)

(52) U.S. Cl. ............ 381/17; 381/18; 381/19; 700/94

(58) Field of Classification Search ......... 381/58–59, 381/310, 66, 93, 95, 96, 98, 101–103, 71.1–71.8, 381/71.11–71.14, 301, 17, 18, 19, 119, 182; 370/310, 208, 508; 379/406.01–406.16
See application file for complete search history.

(56) References Cited

U.S. PATENT DOCUMENTS 4,677,676 A * 6/1987 Eriksson ............... 381/71.11
(Continued)

FOREIGN PATENT DOCUMENTS

DE           19505610 A1     2/1995
(Continued)

OTHER PUBLICATIONS

Abdolmajid Hadidi, et al, "Eigenvalues of a Dielectric-Coated Conducting Cone", IEEE Transactions on Antennas and Propagation, vol. AP.35, No. 3, Mar. 1987, pp. 299-304.*

(Continued)

*Primary Examiner* — Vivian Chin
*Assistant Examiner* — Leshui Zhang
(74) *Attorney, Agent, or Firm* — Glenn Patent Group; Michael A. Glenn

(57) ABSTRACT

An apparatus for processing an input signal, wherein the input signal comprises a plurality of subsignals associated to discrete transmitters or receivers, wherein the discrete transmitters or receivers are disposed at predetermined geometrical positions with regard to a room, comprises a means for providing a plurality of wave-field components, wherein a superposition of the plurality of wave-field components results in a composite wave field, wherein the composite wave field can be propagated in the room, wherein the plurality of wave-field components are derived from the input signal by wave field decomposition based on orthogonal wave field base functions and the predetermined geometrical positions, a plurality of single filters, wherein a wave-field component of the plurality of wave-field components is associated to a single filter, wherein the single filter is formed to influence the associated wave-field component such that with regard to the plurality of single filters a plurality of filtered wave-field components representing a processed input signal are obtained on the output side.

31 Claims, 24 Drawing Sheets

U.S. PATENT DOCUMENTS

| | | | | |
|---|---|---|---|---|
| 5,119,196 | A * | 6/1992 | Ayanoglu et al. | 348/614 |
| 5,187,692 | A * | 2/1993 | Haneda et al. | 367/135 |
| 5,272,757 | A * | 12/1993 | Scofield et al. | 381/381 |
| 5,329,587 | A * | 7/1994 | Morgan et al. | 379/406.09 |
| 5,485,523 | A | 1/1996 | Tamamura et al. | |
| 5,493,616 | A | 2/1996 | Iidaka et al. | |
| 5,638,311 | A | 6/1997 | Fujii et al. | |
| 5,699,437 | A * | 12/1997 | Finn | 381/71.7 |
| 5,761,318 | A * | 6/1998 | Shimauchi et al. | 381/66 |
| 5,838,802 | A * | 11/1998 | Swinbanks | 381/71.2 |
| 5,862,233 | A * | 1/1999 | Poletti | 381/63 |
| 6,246,760 | B1 * | 6/2001 | Makino et al. | 379/406.08 |
| 6,931,123 | B1 * | 8/2005 | Hughes | 379/406.01 |
| 7,138,576 | B2 * | 11/2006 | Metcalf | 84/723 |
| 7,171,003 | B1 * | 1/2007 | Venkatesh et al. | 381/66 |
| 2002/0093919 | A1 * | 7/2002 | Bershad et al. | 370/286 |
| 2002/0114269 | A1 * | 8/2002 | Onggosanusi et al. | 370/208 |
| 2003/0105540 | A1 | 6/2003 | Debail | |
| 2004/0032955 | A1 * | 2/2004 | Hashimoto et al. | 381/18 |
| 2005/0123149 | A1 * | 6/2005 | Elko et al. | 381/92 |

FOREIGN PATENT DOCUMENTS

| | | |
|---|---|---|
| DE | 4308398 C2 | 7/1995 |
| DE | 19606543 A1 | 2/1996 |
| DE | 4410723 C2 | 3/1996 |
| EP | 0 766 446 A2 | 4/1997 |
| EP | 1 229 709 A2 | 8/2002 |
| EP | 1 282 297 A2 | 2/2003 |
| JP | 01-231597 | 9/1989 |
| JP | 08-125593 | 5/1996 |
| JP | 09-312597 | 12/1997 |
| JP | 2002-217793 | 8/2002 |
| WO | WO 2005/046194 A1 | 5/2005 |

OTHER PUBLICATIONS

S. Spors, et al, "Listening Room Compensation for Wave Field Synthesis", IEEE, Multimedia and Expo; ICME '03 Proceedings, 2003 International Conference, Jul. 6-9, 2003, p. 725-728.*

S. Spors et al., "An Approach to Listening Room Compensation with Wave Field Synthesis", AES 24th International Conference on Multichannel Audio, Jun. 26-28, 2003, pp. 1-13.

Improved Microphone Array Configurations for Auralization of Sound Fields by Wave Field Synthesis. Audio Engineering Society Convention Paper 5337. 110th Convention. May 12-15, 2001. Amsterdam. The Netherlands.

Recent Developments and Improvements in Soundfiled Microphone Technology. 75th AES Convention. Mar. 27-30, 1984. Paris, France.

Benesty, et al. Adaptive signal processing: Application to Real-World Problems. Spriner-Verlag, Berlin: Feb. 2003.

Shimauchi, et al. Stereo Projection Echo Canceller with True Echo Path Estimation. Proc. IEEE International COnference on Acoustic, Speech, and Signal Processing (ICASSP). Detroit, MI. May 1995.

Benesty, et al. A Better Understanding and an Improved Solution to the Problems of Stereophonic Acoustic Echo Cancellation. Proc. IEEE International Conference on Acoustics, Speech and Signal Processing (ICASSP), Munich, Germany. Apr. 1997.

Miyoshi, et al. Inverse Filtering of Room Acoustic. IEEE Transactions on Acoustics, Speech and Signal Processing. vol. 36, No. 2. Feb. 1998.

Sklar, B. Digital Communications. Prentice Hall. Englewood Cliffs, NJ. 1988.

Fielder, L. Practical Limits for Room Equalization. Audio Engineering Society Convention Paper 5481. 111th Convention. Sep. 21-24, 2001. New York, NY.

Haydin, S. Adaptive Filter Theory. 3 Ed. Prentice Hall, Inc. Englewood Cliffs, NJ. 1996.

Hyvaerinen, et al. Independent-Component Analysis. John Wiley & Sons, Inc. New York. 2001.

Johnson, et al. Array Signal Processing: Concepts and Techniques. Prentice Hall. Upper Saddle River, NJ. 1993.

Burg, et al. Hoehere Mathematik fuer ingeneure—Band V: Funktionalanalysis und Partielle Differentialgleichungen, Teubner Verlag, Stuttgart, 1993 und in der Schrift A. Sommerfeld, Voresungen uber theoretische Physic, Verlag Harri Deutsch, Frankfurt, 1978.

Williams, E. Fourier Acoustic. Academic PRess. London, UK. 1999.

Berkhout, A. Applie Seismic Wave Theory, Elsevier, Amsterdam, The Netherlands. 1987.

* cited by examiner

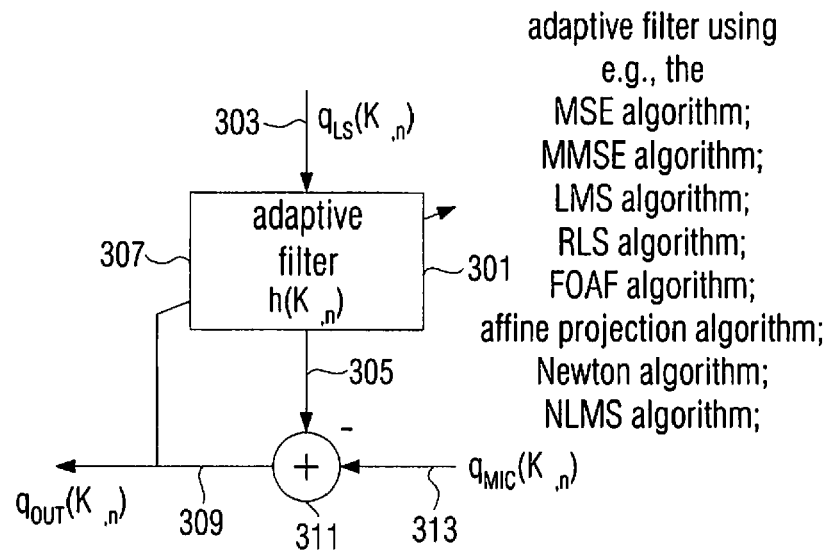

adaptive filter using e.g., the
MSE algorithm;
MMSE algorithm;
LMS algorithm;
RLS algorithm;
FOAF algorithm;
affine projection algorithm;
Newton algorithm;
NLMS algorithm;

adaptation equation $$q_{out}(K_\theta,n) = q_{MIC}(K_\theta,n) - H^T(K_\theta,n) \cdot Q_{LS}(K_\theta,n)$$

MIT:

$$H(K_\theta,n+1) = H(K_\theta,n) + \mu \frac{Q_{LS}(K_\theta,n)}{\|Q_{LS}(K_\theta,n)\|^2} \cdot q_{out}(K_\theta,n)$$

$\mu$: interface

```
Mar 10, 04 15:01                    WAEC2.m                         Page 1/4
% ---------------------------------------------------------------
% Example code:
% Multichannel Wave-Domain Acoustic Echo Cancellation
% by Herbert Buchner, Univ Erlangen-Nuremberg.
% --------------------------------------------------------------- startupdata;

% ============== WFS =========================

% Simple wave-field synthesis according to loudspeaker
% array geometry for generating test signals for the loudspeakers.
% One virtual point source is generated, i.e., we have a SIMO WFS system.
disp('WFS filters ...');
[ls_x,ls_y,source_pos,G] = wfs_filters;

% =============== PARAMETERS ========================== nLs=size(G,2);
nAngles=32;
fs=48000;
radius=0.5;
f_alias=round(340/(2*pi*radius/nAngles));

G=resample(G,f_alias,fs);

% ============== LOUDSPEAKER ARRAY TRANSFORMS ========================== c_result1 = zeros(nLs,nAngles,size(G,1)+1024-1);  %2*IRlength);

for i=1:nLs

% Generation of a virtual wavefield (p,v) on the microphone locations.
    % The wavefield originates from a point source which transmits an impulse.
    % This point source represents one of the loudspeakers.
    angle=atan(ls_y(i)./ls_x(i));
    if (ls_x(i)<0)
        angle=angle+sign(ls_y(i))*pi;
    end
    angle=180*angle/pi;
    angle=270-angle;
    disp('calc circspherewave ...');
    [p,v] = circspherewave(newt(1024,1/f_alias),newangle(nAngles),radius,sqrt((ls_
x(i)).^2+(ls_y(i)).^2),angle);

% Now, a plane wave decomposition of this (virtual) wavefield is calculated
    disp('calc circrt (LS) ...');
    [q1,q2] = circrt(p,v,radius);

% ---------------- convolution of transformation filters with WFS ----------
    --------
    disp('calc conv: transf with WFS ...');
    for k=1:nAngles
        c_result1(i,k,:)=conv(squeeze(G(:,i)), squeeze(q1.data(:,k)));
    end
end
% ---------------------------------------------

% superposition of the contributions of the different loudspeakers disp('calc superposition of LS ...');
c_result = zeros(nAngles,size(c_result1,3));
for i=1:nLs
    c_result = c_result + squeeze(c_result1(i,:,:));
end clear c_result1;
```

FIGURE 18B

Mar 10, 04 15:01　　　　　　　　WAEC2.m　　　　　　　　Page 2/4

```
% ------------------------------------------------------
% load signal of the virtual point source disp('load signal of virtual point source ...');
s=wavread('Air_Bach_48kHz.wav');
s=resample(s.data,f_alias,fs);

% convolution disp('calc convolution to get x_pw ...');
x_pw=zeros(length(s)+size(c_result,2)-1,nAngles);
for k=1:nAngles
    x_pw(:,k)=conv(s,squeeze(c_result(k,:))');
end clear c_result;

% ------------------------------------------------------

% transformation of loudspeaker signals into
% time-wavenumber space disp('transformation into the k_theta domain ...');
x_pw_t_kTheta=fft(x_pw,[],2);

% ============== MICROPHONE ARRAY TRANSFORMS ==============

% calculate plane wave decomposition for a cicular microphone array
% recorded with the 'measure_field.m' script after S.Spors
% (using sound field microphones)

% parameters
fs = 48000;                          % sampling rate
radius = 0.5;                        % radius of circular array
pv_scale = 1.7;                      % scale factor between p and v measurements % options
plot_pw_deco_figures = 0;
downsample = 1;

% load data:
% Room acoustics. Recorded with sound field microphones
disp('load recorded data from sound field microphones ...');
load wavefield;

for i=1:nLs
    [n_pos,IRlength] = size(squeeze(p(i,:,:)));

% build data objects
    p1 = data(squeeze(p(i,:,:))');
    p1.x = newangle(n_pos);
    p1.y = axise(newt(IRlength, 1/fs));

v1 = data(pv_scale * squeeze(v(i,:,:))');
    v1.x = newangle(n_pos);
    v1.y = axise(newt(IRlength, 1/fs));

% perform plane wave decomposition
```

FIGURE 18C

Mar 10, 04 15:01　　　　　　　WAEC2.m　　　　　　　Page 3/4

```
   disp('calculating plane wave decomposition ...');

% calculate a plane-wave decomposition of this wavefield
   disp('calc circrt ...');
   [q1,q2] = circrt(p1,v1,radius);

% ----------------- convolution of transformation filters with WFS -----------
   ------
     for k=1:nAngles
       tmp=conv(squeeze(G(:,i)),resample(squeeze(q1.data(:,k)),f_alias,fs));
       if (i==1 & k==1)
         c_result1 = zeros(nLs,nAngles,length(tmp));
       end
       c_result1(i,k,:)=tmp;
     end
end
% ------------------------------------------------

% superposition of the contributions of the different loudspeakers c_result = zeros(nAngles,size(c_result1,3));
for i=1:nLs
   c_result = c_result + squeeze(c_result1(i,:,:));
end clear c_result1;

% ------------------------------------------------

% convolution

% create delay
delay=zeros(1024,1);
delay(1024)=1;

y_pw=zeros(length(s)+size(c_result,2)+1024-2,nAngles);
for k=1:nAngles
   tmp=conv(s,squeeze(c_result(k,:))');
   y_pw(:,k)=conv(tmp,delay);
end clear c_result;

% ------------------------------------------------

% transformation of microphone signals into
% time-wavenumber space y_pw_t_kTheta=fft(y_pw,[],2);

% ========== ADAPTIVE FILTERING ==================

L=1024;      % number of taps (FIR models for each channel)
Hstep=1      % dist. between snapshots of imp. resp. (max.: length(x))

farendnoise=Inf    % Far-end-SNR in dB (on each far microphone)
nearendnoise=Inf   % Near-end-SNR in dB (on the near microphone)

h_F_start=zeros(L,1);
```

FIGURE 18D

```
Mar 10, 04 15:01                    WAEC2.m                         Page 4/4 y_pw_t_kTheta=y_pw_t_kTheta(1:size(x_pw_t_kTheta,1),:);

n=zeros(size(y_pw_t_kTheta,1),1);

k=1;
[err,h_snap,yn,eps]=FDAF_overlap_mono_DTD(squeeze(x_pw_t_kTheta(:,k)),squeeze(y_
pw_t_kTheta(:,k)),n,L,h_F_start,Hstep);

err_k_theta=zeros(length(err),nAngles);
err_k_theta(:,1)=err;

h_snap_theta=zeros(size(h_snap,1),size(h_s
h_snap_theta(:,:,1)=h_snap;

for k=2:nAngles
  k
   (err_k_theta(:,k),h_snap_theta(:,:,k),yn          )_mono_DTD(squeeze(x_
pw_t_kTheta(:,k)),squeeze(y_pw_t_kTheta(:,      ,Hstep);
end

% =========== INVERSE TRANSFORMATION ====================== e_pw=ifft(err_k_theta,[],2);

e=sum(real(e_pw),2);

er=resample(e,11025,f_alias);
er=0.95.*er./max(abs(er));

save er_file er y_pw2=ifft(y_pw_t_kTheta,[],2);

y=sum(real(y_pw2),2);
rate=f_alias yr=resample(y,11025,f_alias);
yr=0.95.*yr./max(abs(yr));

save yr_file yr
```

APPARATUS AND METHOD FOR PROCESSING CONTINUOUS WAVE FIELDS PROPAGATED IN A ROOM

CROSS-REFERENCE TO RELATED APPLICATION

This application is a continuation of copending International Application No. PCT/EP2004/012570, filed Nov. 5, 2004, which designated the United States and was not published in English.

BACKGROUND OF THE INVENTION

1. Field of the Invention

The present invention relates to an apparatus and a method for processing an input signal, an apparatus and a method for detecting a transmission characteristic of a room, an apparatus and a method for suppressing interferences, an apparatus and a method for detecting an inverse transmission characteristic of a room, an apparatus and a method for generating a prediction error signal, an apparatus and a method for retrieving a useful signal from an input signal, an apparatus and a method for suppressing an interference portion in a received signal. Particularly, the present invention relates to multidimensional adaptive filtering.

2. Description of the Related Art

In a signal propagation in a room between a sender and a receiver, such as in a wave propagation, it is often required to detect which influence the room has on the propagating waves by its room characteristic, for example a room impulse response. If the influence of the room is known, the same can be reproduced and/or reversed in the receiver, for example by adaptive filtering.

In order to determine the room characteristic, a transmitter transmits a signal known to a receiver, which is tapped off by a receiver. Based on a comparison between the transmitted and the tapped-off (detected) signal, the characteristic of a transmission channel between the transmitter and the receiver can be concluded, which results in a single-channel system (point to point connection).

Generally, several transmitters and several receivers can be positioned in the room, so that a multichannel system which several inputs and/or several outputs results, by which the room characteristic can be determined at the locations of the room determined by the arrangement of transmitters and receivers. Generally, these are so-called adaptive MIMO systems (MIMO=multiple input/multiple output). However, in these systems, only the relationships between the inputs and the outputs at discrete fixed room positions are considered, e.g. in the form of impulse responses or frequency responses. However, the field emitted by the transmitters is continuous and propagates in the form of wave fronts. Location-dependencies within the field are thus not considered in the prior art, since the received signals are processed directly based on an input/output description. In most applications, for example acoustics, only relatively few input channels of the adaptive system are assumed, as has been discussed in the paper J. Benesty and Y. Huang (eds.), Adaptive signal processing: Application to real-world problems, Springer-Verlag, Berlin, February 2003.

In a MIMO case of adaptive filtering according to the prior art, the following disadvantages result. On the one hand, the computing effort is very high due to the cross responses. For example, an adaptive filter with P input channels and Q output channels will adapt P Q responses and follow their changes. These individual responses can themselves have several hundred or thousand adaptive parameters, depending on the applications. To determine a room characteristic exactly, many input channels are required. With increasing number of input channels, convergence problems will occur, particularly with correlation between the input channels, such as has been described, for example, in the papers S. Shimauchi and S. Makino, "Stereo Projection Echo Canceller with True Echo Path Estimation", Proc. IEEE International Conference on Acoustic, Speech, and Signal Processing ICASSP95, Detroit, Mich., USA, pages 3059-3062, May 1995, and J. Benesty, D. R. Morgan and M. M. Sondhi, "A better understanding and an improved solution to the problem of stereophonic acoustic echo cancellation", Proc. IEEE International Conference on Acoustic, Speech, and Signal Processing ICASSP97, Munich, pp. 303-306, April 1997.

FIG. 20 shows an embodiment of a time discrete adaptive filter according to the prior art. The adaptive filter 2401 has L filter coefficients, which are combined to a vector h=[h (0), ..., h(L−1)]. The filter 2401 has an input 2043 and an output 2405. An input signal u(n) is applied to the input 2403 of the filter 2401. An output signal y(n) is applied to the output 2405. The output 2405 is coupled to a summer 2407. The summer 2407 has a further input 2409, to which a signal d(n) is applied, as well as an output 2411 to which a signal e(n) is applied. A block 2413 is connected between the input 2403 of filter 2401 and the output 2411 of the summer 2407, wherein an adaptation algorithm for the filter coefficients is performed. Thus, block 2413 receives the signal u(n) as well as the signal e(n). Further, block 2413 has an output 2415 coupled to the filter 2401. The filter coefficients determined by the adaptation algorithm in the block 2413 are provided to the filter 2401 via the output 2415.

Adaptive time discrete filters of FIG. 20 represent a common technique in digital signal processing. The principle is to determine filter coefficients (combined to a vector h in the embodiment illustrated in FIG. 20) such that the output signal y(n) of the system (or an output channel in a multichannel system, respectively) is approximated to a desired signal d(n) or several desired signals, respectively, in a multichannel system at a known input signal u(n) (or several known input signals, respectively). This is achieved by block-wise minimization of the error signal e(n)=d(n)−y(n) or several error signals, respectively, in a multichannel system according to a predetermined criterion. A mean square error is, for example, used as criterion. The block length of the filter can be higher or equal to a sample. An optimization of the filter coefficients can further be performed recursively or non-recursively.

According to the prior art, the applications of adaptive filtering can be generally divided into four classes, as indicated in the paper of S. Haykin, Adaptive Filter Theory, 3. Ed., Prentice Hall Inc., Englewood Cliffs, N.J., USA, 1996. These are system identification, inverse modeling, prediction and interference suppression.

FIG. 21 shows a basic block diagram for single-channel system identification. The unknown system 2501, whose characteristic, such as an impulse response has to be determined, is excited via a system input 2503. Further, the unknown system 2501 has an output 2505, where a system output signal can be tapped off in response to an excitation signal. An adaptive filter 2507 is coupled to the system input 2503. The adaptive filter 2507 has an output 2509 as well as an adaptation input 2511.

A summer 2513 is disposed between the output 2509 of the adaptive filter 2507 and the output 2505 of the unknown system 2501, whose output is coupled to the input 2511 of the adaptive filter 2507.

As has already been mentioned, system identification is about determining the characteristic of the unknown system 2501, which can, for example, be a room, where the acoustic waves propagate. The characteristic of the room can, for example, be an impulse response which is characterized in the form of discrete impulse response coefficients, which can also be considered as filter coefficients. In order to determine the impulse response, the adaptive filter 2507 is excited in parallel to the unknown system 2501. An error signal e(n) is generated from the comparison of the systems applied to the respective output 2509 and 2505, based on which the adaptive filter 2507 is adapted. Thereby, the summer 2513 adds the output signal d(n) of the unknown system 2501 with an output signal y(n) valued with a negative sign. The result of this difference is supplied to the filter as error signal e(n). During adaptation, the filter coefficients are adapted for so long until the error signal e(n) is as low as possible. If e(n)=0, the coefficient set of the adaptive filter 2507 reflects exactly the impulse response of the unknown system 2501. In other words, after minimizing the error signal e(n), the modeling adaptive filter 2507 is optimally adapted to the unknown system 2501 (the system to be modeled) in the sense of the used optimization criteria, such as the criterion of the least-mean-error square. Apart from a single-channel system identification illustrated in FIG. 21, multichannel systems are identified, wherein, as has already been discussed, only discrete locations are considered. Such systems are described, for example, in S. Shimauchi and S. Makino, "Stereo Projection Echo Canceller with True Echo Path Estimation", Proc. IEEE International Conference on Acoustics, Speech, and Signal Processing ICASSP95, Detroit, Mich., USA, pages 3059-3062, May 1995 and in J. Benesty, D. R. Morgan, and M. M. Sondhi, "A better understanding and an improved solution to the problem of stereophonic acoustic echo cancellation", Proc. IEEE International Conference on Acoustic, Speech, and Signal Processing ICASSP97, Munic, pages 303-306, April 1997.

In inverse modeling, the unknown system to be modeled is in series with the adaptive filter. FIG. 22 shows a basic block diagram of a system for inverse modeling.

The unknown system 2601 has an input 2603 and an output 2605. An adaptive filter 2607 is connected to the output 2605 of the unknown system 2601, which has an output 2609 as well as a further input 2611. The input 2603 of the unknown system 2601 is further coupled to a delay element 2613. The delay element 2613 has an output 2615 coupled to the output 2609 of the adaptive filter 2607 via a summer 2617. The summer 2617 has an outputs which is connected with the input 2611 of the filter 2607. In contrary to system identification, inverse modeling tries to reduce an influence of the unknown system 2601, for example its impulse response. Thereby, a difference is formed within the filter output signal and the system input signal. For considering a delay of the filter 2607 and the system 2601, optionally, a delay element 2613 can be provided in the reference branch. In inverse modeling according to FIG. 22, the system 2601 to be modeled is in series with the adaptive filter 2607. After minimizing the error signal e(n), the adaptive filter corresponds to the inverse unknown system in the optimum sense, depending on the used optimization criteria (for example the criterion of least mean error square). Apart from a single-channel inverse system modeling shown in FIG. 22, according to the prior art, in a multichannel case only discrete room positions are optimized, such as is described, for example, in the paper Masato Miyoshi, Yutaka Kaneda, "Inverse Filtering of Room Acoustics" IEEE Transactions on Acoustics, Speech, and Signal Processing, vol. 36, no. 2, February 1988.

FIG. 23 shows a block diagram of a prediction structure. The prediction structure has a delay member 2701 having an input 2703 and an output 2705. The output 2705 is coupled to an adaptive filter 2707, which has an output 2709 as well as a further input 2711. Parallel to the branch formed of delay member 2701 and adaptive filter 2707, is an adder 2713, whose input 2715 is connected to the input 2703 of the delay element 2701. Further, the adder 2713 has an output 2717 as well as a further input coupled to the output 2709 of the adaptive filter 2707.

In prediction, an estimate for a current signal value u(n) is determined from a number of past signal values, and a difference between the current value and the estimate, which is to be applied to the output 2709, is transmitted. In order to adaptively adjust the coefficients of the filter 2707, the difference signal applied to the output 2717 is supplied to the filter as reference for an adaptation of the filter coefficients. By this arrangement, it is obtained that the adaptive filter predicts the desired signal in an optimum way (corresponding to a used optimization criterion, such as a criterion of the least mean error square). Thus, only the unpredictable, i.e. the information carrying signal portion remains, which is transmitted as prediction error signal. In the receiver, an inverse operation is performed to retrieve the redundancy suppressed in the transmitter to reproduce the input signal as exactly as possible.

FIG. 24 shows a block diagram of a system for interference suppression according to the prior art. The system comprises an adaptive filter 2801 with an input 2803, an output 2805 as well as an adaptation input 2807. The output 2805 is coupled to an adder 2809. The adder 2809 has an output 2811 as well as an input 2813. The output 2811 of the adder 2809 is coupled to the adaptation input 2807 of the filter 2801.

Interference suppression according to claim 24 corresponds structurally to the basic concept of adaptive filtering according to FIG. 20, wherein the filter coefficients are adjusted in dependence on the used optimization criterion. Typically, a primary signal d(n) applied to the input 2813 of the adder 2809 consists of a mixture of useful signals and interference signals. A reference signal u(n) applied to the input 2803 of the filter 2801 is an estimate of the interference signal (the interference). Corresponding to an optimization criterion, such as a criterion of the least mean error square, the interference suppression minimizes the error signal e(n), which is a difference from the signal d(n) and the signal y(n). Thereby, the interference in the error signal is suppressed, which has the effect, in the ideal case, that useful signals are output and transmitted via the output 2811. Above that, the primary signal and the reference signal can be interchanged, so that the input signal of the adaptive filter corresponds to a mixture of useful signals and interference. This structure can be used in a location selective noise suppression. If the primary signal is set to zero, and a mixture of useful signals and interference signals is used as reference signal, statistical optimization criteria of blind source separation can be used. Such a concept is described in the paper A. Hyvärinen, J. Karhunen and E. Oja, Independent Component Analysis, John Wiley & Sons, Inc., New York, 2001. The known approaches according to the prior art are thereby limited to single or multichannel interference reduction and blind source separation at a few determined discrete room positions (sensor locations by placing the room information at a system output).

It is a disadvantage of the known approaches according to the prior art that the emitted signals in the form of electromagnetic waves or in the form of acoustic sound waves are only detected and processed at a few discrete room positions. Information about the system is calculated based on the determined room properties at the discrete positions. However, this causes a significant determination error, if merely only a few sensors are positioned in the room to determine the room characteristic. To obtain a more specific determination of the room characteristic, a plurality of actors and sensors has to be positioned to discretize the room sufficiently. However, the computing effort increases significantly, since a system with high complexity has to be positioned, whose production and maintaining costs rise correspondingly.

It is a further disadvantage of the known concept that a continuous room characteristic, such as occurring during propagation of the electromagnetic waves can basically not be reproduced by the known systems. If the number of actors and sensors is increased to discretize the room further, the devices positioned in the room will have a significant influence on the detected room characteristic, since, for example, the echoes between the adjacent loudspeakers and microphones in the case of acoustic sound waves superpose the reflections caused by the room. These negative influences can only be eliminated approximately by complex compensation algorithms.

It is a further disadvantage of the multichannel concepts according to the prior art that the conventional approaches are in the way of an efficient implementation of wave-field synthesis or wave-field analysis. In wave-field synthesis, for example with a plurality of loudspeakers, which are idealized as spherical antenna, an acoustic sound field in a room where the loudspeaker are positioned can be reproduced exactly and at every location of the room and at any time. Therefore, however, it is required to be able to determine the room characteristic of the room where the loudspeakers are positioned also at any location. Since the conventional approaches only allow a characterization at discrete locations, it is basically not possible to reproduce the desired acoustic sound field exactly at every location of the room with the help of wave-field synthesis by using the standard concept for detecting the room characteristic.

SUMMARY OF THE INVENTION

It is an object of the present invention to provide a concept for processing continuous wave fields, which can be propagated in a room.

In accordance with a first aspect, the present invention provides an apparatus for processing an input signal, wherein the input signal has a plurality of subsignals associated to discrete transmit or receive means, wherein the discrete transmit or receive means are disposed at predetermined geometrical positions with regard to a room, having: a means for providing a plurality of wave-field components, which is formed to provide a plurality of wave-field components, wherein a superposition of the plurality of wave-field components results in a composite wave field, wherein the composite wave field can be propagated in the room, wherein the plurality of wave-field components is derived from the input signal by a wave-field decomposition based on orthogonal wave field base functions and the predetermined geometrical positions; a plurality of single filters, wherein a single filter is associated to a wave-field component of the plurality of wave-field components, and wherein a single filter is formed to influence the associated wave-field component such that with regard to the plurality of single filters, a plurality of filtered wave-field components representing a processed input signal are obtained on the output side.

In accordance with a second aspect, the present invention provides a method for processing an input signal, wherein the input signal comprises a plurality of subsignals associated to discrete transmit or receive means, wherein the discrete transmit or receive means are disposed at predetermined geometrical positions of a room, having the steps of: providing a plurality of wave-field components, wherein a superposition of the plurality of wave-field components results in a composite wave field, wherein the composite wave field can be propagated in the room, wherein the plurality of wave-field components is derived from the input signal by a wave-field decomposition based on orthogonal wave field base functions at predetermined geometrical positions; and filtering wave-field components, wherein a wave-field component of the plurality of wave-field components can be influenced such that a plurality of filtered wave-field components representing a processed input signal are obtained on the output side.

The present invention further provides an apparatus for detecting a transmission characteristic of a room during propagation of a wave field, an apparatus for actively suppressing interferences in an excitation signal, an apparatus for detecting an inverse transmission characteristic of a room during propagation of a wave field, an apparatus for generating a prediction error signal from an input signal, an apparatus for retrieving a useful signal from an input signal, an apparatus for suppressing an interference portion in a received signal comprising the interference portion and a useful portion, a method for processing an input signal, a method for detecting a transmission characteristic of a room during propagation of a wave field, a method for actively suppressing interferences in an excitation signal, a method for detecting an inverse transmission characteristic of a room during propagation of a wave field, a method for generating a prediction error signal from an input signal, a method for retrieving a useful signal from an input signal, a method for suppressing an interference portion in a received signal comprising the interference portion and the useful portion, and a computer program with a program code for performing the above-mentioned methods.

The present invention is based on the knowledge that a room characteristic can be characterized at any location by an efficient utilization of Green's law. Green's law allows that the distribution of a physical field quantity within a closed volume is expressed by the edge distribution as well as of the gradient of the edge distribution. According to the invention, this connection is utilized to transform a multidimensional field problem into a multichannel MIMO problem. Instead of tapping-off the required quantities directly from the multidimensional field, the respective quantities are tapped off at an edge according to the invention, this means that an edge distribution of the emitted field is detected, and not, as is known according to the prior art, by using an input/output description.

In order to explain the inventive concept, first, the case of adaptive filtering will be discussed below. Contrary to the known concepts of multichannel adaptive filtering, where the filter coefficients are only optimized for individual discrete positions of the room, according to the invention, optimization is performed across a whole area of the room. This means that the filter parameters, such as filter coefficients, are not only determined for individual discrete locations of the room but for the whole area of the room.

Within a fixed frequency range (below the so-called aliasing frequency according to the spatial sampling theorem), with sufficiently fine time and spatial sampling, a multidimensional continuum can be adaptively exactly reproduced via multichannel sensor and actor arrays. The actor and sensor arrays can, for example, be transmit and receive antennas if, for example, a room characteristic with regard to a propagation of electromagnetic waves is of interest. Alternatively, the actor and sensor arrays can be loudspeaker and microphone systems, if the considered wave field is an acoustic sound field.

If a wave field is emitted by a plurality of discretely arranged (discrete) transmitters, a field distribution can be tapped off with the help of discretely arranged receive means. Contrary to the known point to point based approaches according to the prior art, according to the invention, a different path is taken, where the point to point system consideration is given up in favor of a global field consideration. After tapping-off the received field, the signals are not used to determine the room characteristic directly. Rather, starting from the tapped-off signals, a decomposition of a wave field into wave field components is performed, wherein a superposition of the wave field components reproduces the wave field at every location of the room. The wave field components are determined based on orthogonal base functions, such as based on Hankel or Bessel functions. According to the invention, the wave field components are processed further, for example to determine a characteristic of the room at any location (system identification, for example to eliminate a spatial signal feedback of actors and sensors, inverse system modeling, for example to eliminate the room influence on a useful signal, or interference suppression to suppress interferences).

In the following, the inventive concept will be discussed with the example of propagation of acoustic sound waves.

FIG. 19 shows a room 2301, wherein a virtual source s(t) 2303 is positioned. The virtual source 2303 can, for example, be a virtual loudspeaker, which is reproduced, for example, by a wave-field synthesis. A loudspeaker array 2305 is positioned in a square form in the room 2301. Within the region formed by the loudspeaker array, a circular microphone array 2307 is positioned. A position vector $\vec{r}_{Mic,q}$ extends from the middle of the circle formed by the microphones up to edge. A position vector $\vec{r}_{LS,p}$ extends from the middle of the circle to any point of the loudspeaker array 2305. Any location at the edge of the microphone array 2307 can be specified with the help of the position vector $\vec{r}_{Mic,q}$. With a known radius of the array formed by microphones, it is sufficient to characterize the geometrical position of a microphone within the microphone array 2307 by indicating the angle Θ.

In the following, it is assumed that the microphones in a microphone array 2307 provide a pressure p(θ,t) as well as a sound velocity v̄(θ,t). Thereby, for example, the arrangements described in D. S. Jagger, "Recent developments and improvements in soundfield microphone technology", Preprint 2064 of 75$^{th}$ AES Convention, Paris, March 1984 can be used. The wave field tapped-off by the microphones comprises the room influence, which is noticeable, for example, by reflections or scattering at the room walls.

In order to reproduce an effect of the virtual source in the room, the loudspeakers are excited accordingly. If, for example, P loudspeakers are positioned, the loudspeaker signals are:

$$x(\vec{r}_{LS,p}, t) = \sum_i g_{pi}(t) \underset{(t)}{*} s_i \cdot (t), p = 1, \ldots, P$$

Thereby, x indicates the loudspeaker signals, g the wave-field synthesis filters and s the source signal. The operator "*" means convolution. The wave-field synthesis filter (WFS filter) associates a portion of the virtual source to every loudspeaker. In the following, this wave-field synthesis system is referred to as "transformation 1a".

In a further step, the field reproduced by the loudspeaker array can be extrapolated from the microphone positions of the circular microphone array. This can be performed by first calculating a "spatial impulse response" of one loudspeaker each to all microphone positions in a free wave propagation, i.e. without reflections in the room. If it is assumed that every loudspeaker can be modeled as a point source, which emits spherical waves, the associated sound velocity can be calculated in normal direction, which is most relevant in the two-dimensional arrangement illustrated in FIG. 19, across an acoustical impedance of a source wave in a free field. These "P impulse responses" $\underline{p}_{imp}$ are convoluted in time with the loudspeaker signals and all contributions are then superposed.

Thus, for the unreverberated field at the microphone array emitted by the loudspeakers according to this example, the following results for the sound pressure $\underline{p}$ and the sound velocity $\underline{v}$:

$$\underline{p}(\theta_q, \omega) = \sum_{p=1}^{P} \underline{p}_{imp}(r_{pq}, \omega) \cdot F_{(t)}\{x(\vec{r}_{LS,p}, t)\},$$

$$\underline{v}(\theta_q, \omega) = \sum_{p=1}^{P} \frac{1 + \frac{c}{j\omega r_{pq}}}{p \cdot c} \cdot \frac{-\vec{r}_{pq} \cdot \vec{r}_{Mic,q}}{r_{pq} \cdot r_{Mic,q}} \cdot \underline{p}_{imp}(r_{p,q}, \omega) \cdot F_{(t)}\{x(\cdot)\}$$

with $$\underline{p}_{imp}(r_{p,q}, \omega) = \hat{p}_\alpha \frac{1}{r_{pq}} e^{-j\omega \frac{r_{pq}}{c}}$$

$$r_{pq} = \|\vec{r}_{pq}\| = \|\vec{r}_{Mic,q} - \vec{r}_{LS,p}\|$$

Here, ρ indicates the density of the emitting media and c the sound velocity, and $F_{(t)}\{x(\cdot)\}$ the Fourier transform of x with regard to time.

As has already been mentioned, first, the unreverberated sound field is considered.

The unreverberated sound field can be decomposed, for example, into plane wave components, as is known from the paper E. Hulsebos, D. de Vries und E. Bourdillat, "Improved microphone array configurations for auralization of sound fields by wave field synthesis", Audio engineering society 101th convention, Amsterdam, May 2001. If the unreverberated sound field is divided into plane wave-field components, i.e. into wave-field components resulting in a plane wave in superposition, the following results for the example of the circular 2D array:

$$\underline{q}_{LS}^{(1)}(k_\theta, \omega) = j^{(1-k_\theta)} \frac{H_{k_\theta}^{\prime(2)}(kR)P(k_\theta, \omega) - H_{k_\theta}^{(2)}(kR) \cdot j\rho c V(k_\theta, \omega)}{H_{k_\theta}^{(1)}(kR)H_{k_\theta}^{\prime(2)}(kR) - H_{k_\theta}^{(2)}(kR)H_{k_\theta}^{\prime(1)}(kR)}$$

with $$P(k_\theta, \omega) = F_{(\theta)}\{\underline{p}(\theta, \omega)\} = \frac{1}{2\pi} \int_0^{2\pi} \underline{p}(\theta, \omega) e^{-jk_\theta \theta} d\theta$$

$$V(k_\theta, \omega) = F_{(\theta)}\{\underline{v}(\theta, \omega)\}$$

Here, $H_{K_q}^{(n)}(\cdot)$ designates the so-called Hankel functions of n-th type, kθ-th order. Here, kθ designates the order of the extrapoling Hankel function, such as $k_\theta = \ldots, -1, 0, +1, \ldots$, the wave number is designated by k=ω/c and $R = \|\vec{r}_{Mic,q}\|$.

The above-described steps, i.e. the determination of the unreverberated wave field (e.g. at the microphone array) as well as the decomposition of the unreverberated sound field into wave-field components will be referred to below with the term "transformation 1", wherein here the step for determining the unreverberated wave field is optionally.

In contrary to the above-referenced paper, according to this embodiment, inventively, Fourier transforms of the pressures and sound velocities are used. The location dependencies (θ) are thereby replaced by the kθ dependencies. According to the invention, it is now possible to represent the wave field at any location of the room (and at any time) with the help of wave-field components. Particularly, it can thereby be represented how a wave field would look like at the microphone array, if there were no room influence.

The wave field emitted by the loudspeakers is naturally influenced by the room characteristic, so that a receive wave field at the microphone array now differs from a transmit wave field.

The receive wave field is detected by the microphone array and an output signal is generated in response to the detected wave field. The microphones can, for example, be formed such that they already provide the pressures and the sound velocities at the respective position as a subsignal of the output signal. For example, so-called sound-field microphones can be used, as they are known from the already mentioned paper D. S. Jagger, "Recent developments and improvements in soundfield microphone technology", Preprint 2064 of 75$^{th}$ AES Convention, Paris, March 1984.

Analogously to the described decomposition of the wave field to be emitted into the wave-field components, the received reverberated wave field (sound field) can be decomposed into wave-field components when using the same orthogonal wave field base functions, such as Hankel functions. The result of this operation are wave-field components of the form ω, which, as has already been discussed, differ from the original wave-field components due to a room interference. This immediate decomposition into wave-field components will be referred to below with the term "transformation 2".

The above explanations make the inventive approach clear. Since the original wave field can be analytically determined at every location of the room based on its decomposition into orthogonal wave-field components, and since a receive wave field comprising the room influence can be detected and also be decomposed into wave-field components, the room characteristic can be determined at every location of the room based on the (uninfluenced) wave field, represented by wave-field components, as well as the reverberated (influenced) wave field at the microphone array in the form of its wave-field components. The number of wave-field components is dependent on which orthogonal wave field base functions are used. A room resolution can be scaled arbitrarily, since a number of wave-field components which is only limited downwardly by the already mentioned spatial sampling theorem, can be selected in any way, without increasing the number of actors and sensors. Since, according to the invention, the (plane) wave-field components of the original wave field and the receive wave field with regard to $k_\theta$ and with regard to ω are orthogonally or almost orthogonally (after temporal and spatial sampling), adaptive filtering can be performed separately for all wave-field components, indicated by $k_\theta$. In this example, this corresponds to single-channel adaptive filtering between plane waves on the loudspeaker and microphone side. In contrary to the prior art, the wave-field components can now be treated separately, so that the already mentioned problem of coupling between the different paths (signal correlation) no longer occurs. The wave-field components can now be specifically processed, for example by filtering.

It is a further advantage of the inventive approach that the individual frequency components (wave-field components) across w are orthogonal or almost orthogonal after sampling the sensor signals at sufficiently many times. This opens up the possibility to use already developed approaches for adaptive filtering, both in the time and frequency domain, so that the design and realization effort is reduced.

The wave-field components of the receive wave field can now, for example, be filtered in a suitable way to compensate the room influence. The further processing of the compensated components depends on its desired application. The further processed wave-field components can now be used to reconstruct a wave field by their superposition. If the wave-field components of the receive wave field are processed in such a way (e.g. filtered), that, for example, the echoes, i.e. reverse influences from actors to sensors, are eliminated, the sought-for spatial wave field can always be reconstructed, which can, for example, be performed by using the below indicated equation.

$$p^{(1)}(r, \theta, \omega) = \int_0^{2\pi} q_{out}^{(1)}(\theta', \omega) e^{-jkr\cos(\theta-\theta')} d\theta'$$

$q_{out}$ indicates the further processed wave-field components. The reconstruction rule will be referred to below with the term "transformation 3".

If the spatial information at the output is no longer of interest, for example, a superposition of the further processed wave-field components according to p can be output, which corresponds to an omni-directional directivity characteristic during recording. Above that, it is now also possible to output only certain θ components, so that a spatially selective further processing is possible. This is, for example, advantageous, if the inventive concept is used for beam forming or noise suppression.

Since during the decomposition of the wave field in orthogonal wave-field components, Green's law is implicitly used, the inventive concept can always be used where edge distributions of certain quantities are used for the solution of certain, for example mathematical, problems. Fields of application of the inventive concept can be, for example, all physical phenomena that can be described by partial differential equations, for example in acoustics (audible sound waves, ultrasound, etc.), seismology, hydrodynamics, aerodynamics or electrodynamics.

It is another advantage of the present invention that the inventive concept, for example with multidimensional filtering, has a reduced hardware or computing effort compared to the known concepts according to the prior art. The effort reduction is caused by the fact that during filtering or further processing of the wave-field components, their number does not generally depend on the number of positioned sensors or actors, but is merely limited by the spatial sampling theorem, since the number of wave-field components is a mathematical quantity, whose further processing is implemented, for example, in a processor in appropriate way. The further advantage is the obtained orthogonality of the wave-field components. The inventive concept allows also an improvement of the convergence properties during adaptive filtering of the wave-field components, since the same are orthogonal to each other, as has already been mentioned.

It is another advantage of the present invention that the effort in maintaining a desired parameter convergence can be minimized when the concept of multichannel adaptive filtering is extended to the multidimensional case, since the wave-field components can be considered like signals.

As has already been mentioned, according to the invention, adaptive filters are considered, which are explicitly based on partial differential equations. Thereby, the inventive filters are not only optimized at individual room positions, but according to the spatial sampling theorem continuously across the whole area of the room. The sampling theorem is known from the following paper, D. H. Johnson and D. E. Dudgeon, Array Signal Processing: Concepts and Techniques, Prentice Hall, Upper Saddle River, N.J., USA, 1993.

As has already been mentioned, the number of required actors and sensors is reduced according to the invention, since measurements and influences have to be made only at the edge, instead of the whole room volume. In many applications, it would not be practical, to place sensors or actors in the whole volume of the room. This is, for example, the case when a room is for example, to be measured during an opera performance. By reducing the number of sensors and actors, a convergence improvement of adaptation is obtained, since a redundancy within the field is taken out. This results from the already mentioned fact that the number of wave-field components can be determined by the sampling theorem and not by the number of receive means or transmit means.

By combining the adaptive MIMO filtering with an appropriate multidimensional transformation, a further reduction of the complexity and an improvement of the convergence can be obtained, as has been shown with regard to the above example. Transformations causing an orthogonalization of the spatial and temporal components are particularly advantageous. Particularly, a decomposition according to the orthogonal base function of the field problem can be used. Such decompositions are, for example, described in the papers K. Burg, H. Haf and F. Wille, Höhere Mathematik für Ingenieure—Band V: Funktionalanalysis und Partielle Differentialgleichungen, Teubner Verlag, Stuttgart, 1993 and A. Sommerfeld, Vorlesungen Über theoretische Physik—Band VI: Partielle Differentialgleichungen der Physik, Verlag Harri Deutsch, Frankfurt, 1978. Parts of these, are, for example, the wave components of a coordinate system adapted to the respective application. In dependence on the geometry of the sensor and actor arrangement, for example, plane waves, spherical waves or cylindrical waves can be used, i.e. the orthogonal wave field functions comprise Hankel, Bessel, cylinder or spherical functions, as described in the papers E. Williams, Fourier Acoustic, Academic Press, London, UK, 1999 and A. Berkhout, Applied Seismic Wave Theory, Elsevier, Amsterdam, The Netherlands, 1987.

It is another advantage of the present invention that the already mentioned applications, which are so far only known in the context of adaptive filtering or according to the prior art (for example system identification, prediction), can now be efficiently extended to the multidimensional adaptive filtering with the help of the new approach, whereby new fields of application open up. For example, arbitrary room properties can be determined at arbitrary locations of the room with the help of the traditional adaptation techniques, which is, for example, advantageous for a sound reproduction via wave-field synthesis or for recording via wave-field analysis.

BRIEF DESCRIPTION OF THE DRAWINGS

These and other objects and features of the present invention will become clear from the following description taken in conjunction with the accompanying drawings, in which:

FIG. 3 is a block diagram of an adaptive filter according to the present invention;

FIG. 18 is an embodiment of a computer program for performing an inventive echo cancellation;

DESCRIPTION OF THE PREFERRED EMBODIMENTS

Figure 1:
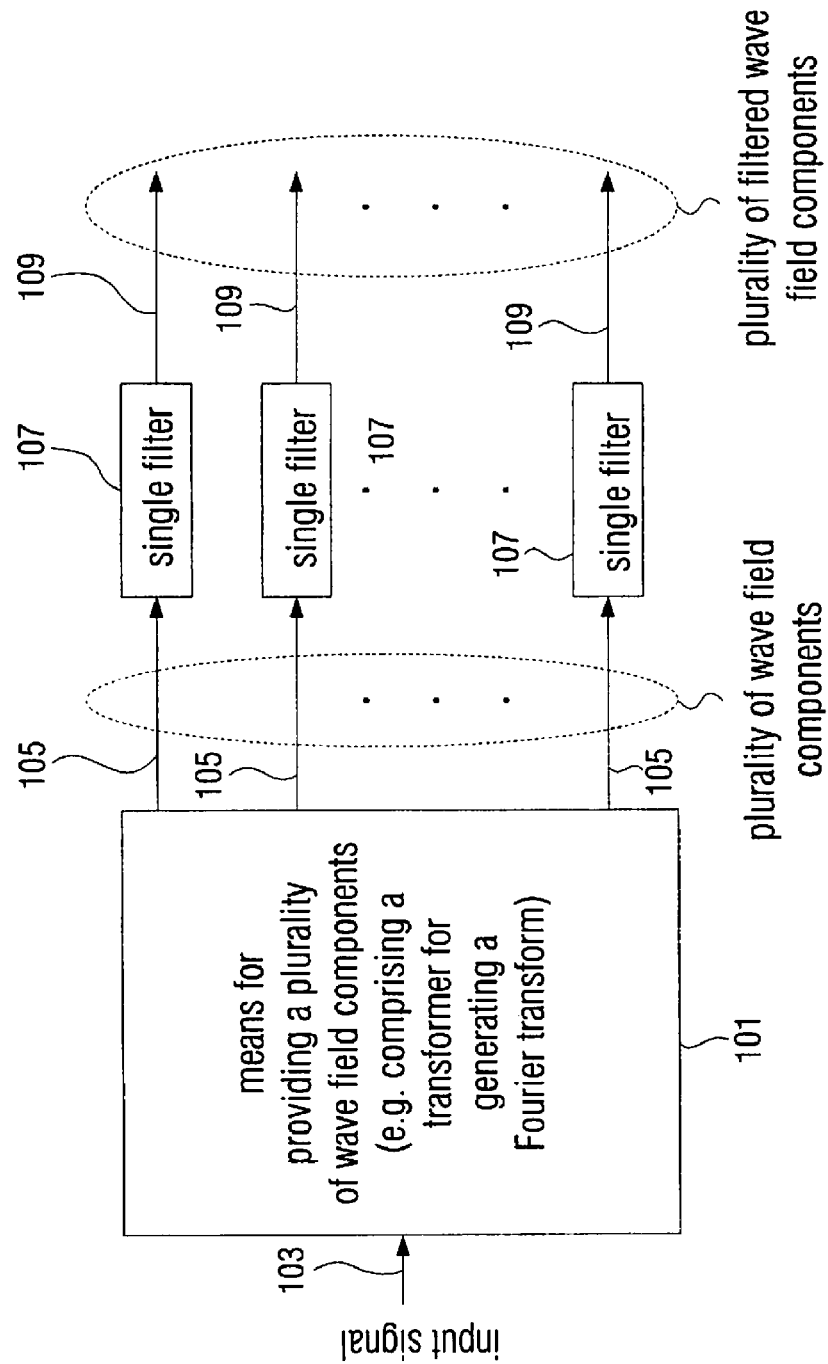
FIG. 1 is a basic block diagram of an inventive apparatus for processing an input signal according to a first embodiment.

FIG. 1 shows a first embodiment of an inventive apparatus for processing an input signal. The apparatus has a means 101 for providing a plurality of wave-field components, wherein the means 101 for providing the plurality of wave-field components has an input 103 as well as plurality of outputs 105.

Further, the apparatus for processing an input signal has a plurality of single filters 107, wherein every output 105 of the means 101 for providing the plurality of wave-field components is coupled to a single filter 107. The plurality of single filters 107 has a plurality of outputs 109, wherein one output 109 is associated to every single filter 107.

In the following, the mode of operation of the apparatus shown in FIG. 1 will be explained.

The means 101 for providing the plurality of wave-field components receives an input signal via the input 103, wherein the input signal has a number of subsignals, which are associated to discrete transmit or receive means. The discrete transmit or receive means are disposed at predetermined geometrical positions with regard to a room. The geometrical positions can, for example, be a circular arrangement or a linear arrangement. The means 101 for providing the plurality of wave-field components is formed to derive the wave-field components from the input signal based on orthogonal wave field base functions and the predetermined geometrical positions. Superposition of the wave-field components results in a composite wave field which can be propagated in the room. The wave field can, for example, be a wave field which is emitted or received, respectively, as has already been discussed. The wave field can be an acoustic sound field, an electromagnetic field or another wave field that can be decomposed into wave-field components with the help of orthogonal wave field base functions. Here, it should be noted that the inventive apparatus do not operate on the wave field itself but on its representation by, for example, electrical signals.

As has already been mentioned, the input signal has a plurality of subsignals associated to the transmit or receive means, respectively. The subsignals can, for example, be excitation signals for the respective transmit means. Analogously, the subsignals can also be received signals associated to the respective receive means.

The wave-field components that can be output via outputs 105 are supplied to a plurality of single filters 107. The single filters are, for example, digital filters filtering the respective wave-field components with the help of filter coefficients. The filter coefficient sets can, for example, be equal or different filter coefficient sets, so that the plurality of wave-field components each experience a different influence by the filter. Thus, the single filters are formed to influence the associated wave-field component such that a plurality of filtered wave-field components representing a processed input signal is obtained on the output side with regard to the plurality of single filters. The processed input signal can, for example, be the plurality of wave-field components after filtering.

As has already been mentioned, the composite wave field can be an acoustic sound field, which can be generated by the discrete transmit means at the predetermined geometrical positions of the room, or which can be detected by discrete receive means at the predetermined geometrical positions of the room. In that case, the subsignals comprise an associated sound pressure and/or an associated sound velocity of the sound field at a predetermined geometrical position of the room.

The means 101 for providing is formed to determine the wave-field components as a connection between a quantity based on the sound pressures and/or a quantity based on the sound velocities with the orthogonal base functions. The quantities can be the sound pressures or sound velocities themselves, respectively. Alternatively, the quantities based on sound pressures or sound velocities, respectively, can be Fourier transforms of the respective sound pressures or sound velocities, respectively. In that case, the means 101 for providing comprises a transformer for generating a spatial Fourier transform of the sound pressures as quantity based on the sound pressures and/or for generating a Fourier transform as quantity based on the sound velocities.

The connection of quantities based on sound pressures and/or sound velocities, can, for example, be the already described connection for generating wave-field components based on Hankel functions. Basically, any orthogonal wave-field function (wave-field base function) can be used, wherein the orthogonal wave-field functions comprise, for example, Hankel or Bessel or cylinder or spherical functions in any dimension, such as 2D or 3D.

Since, according to the invention, a decomposition of the wave field can be performed by a signal processor or digital computer, it is advantageous that the orthogonal wave-field functions are available as function values. In that case, the inventive means for providing the plurality of wave-field components comprises a means for providing discrete function values of orthogonal wave-field functions, such as of support values of Hankel functions in dependency on ke. The means for providing discrete wave-field functions can, for example, comprise a memory where the discrete function values can be stored.

Alternatively, the means for providing discrete function values can be a processor, which calculates the respective function values, for example based on quantities combined in tables, and provides the same.

As has already been mentioned, the single filters can be digital filters, each having discrete filter coefficient sets. The filter coefficients can be fixed to generate a predetermined characteristic of the wave-field components and thus the composite wave field. Alternatively, the single filters can be formed to receive the discrete filter coefficients for filtering the respective wave-field component. This is particularly advantageous when the single filters are fixed adaptively. To determine the filter coefficients adaptively, the inventive apparatus for processing comprises a means for determining discrete filter coefficients, wherein the means for determining discrete filter coefficients is formed to receive a reference wave-field component for a single filter and to determine the discrete filter coefficients by minimizing a difference between the reference wave-field component and the wave-field component. The reference wave-field component can be, for example, the wave-field components of a desired wave field, which has certain local properties, such as a certain local field strength. The wave-field components can be, for example, the wave-field components of the receive wave field, which are to be filtered such that after filtering a desired wave field occurs, as has already been described in connection with adaptive filtering.

Minimizing the difference between the reference wave-field coefficients and the wave-field coefficients can, for example, be performed adaptively. In that case, the inventive means for determining discrete filter coefficients is formed to determine the discrete filter coefficients adaptively, for example in the time or frequency domain, based on known algorithms. In order to calculate the filter coefficients adaptively, for example, the algorithm according to the criterion of the mean squared error (MSE), the criterion of the minimum mean-squared error (MMSE), the criterion of the least mean square (LMS) can be used. Above that, the RLS algorithm (RLS=recursive least squares) or the FDAF algorithm (FDAF=frequency domain adaptive filtering) or another known adaptive algorithm or a variation of the same, can be used.

The inventive means for providing a plurality of wave-field components can, for example, be formed to perform the mentioned transformation 1a and 1 to determine a wave field decomposition. Alternatively, the inventive means 101 for providing the plurality of wave-field components can be formed to perform the already described transformation 2, where already the pressures and the sound velocities can be used directly for wave field decomposition in the case of an acoustic sound field.

The plurality of filtered wave-field components at the output of the plurality of single filters 107 can already be transmitted to a distant means in this form in order to be further processed there. Alternatively, the inventive apparatus can comprise a means for reconstructing a wave field from the filtered wave-field components. The means for reconstructing not shown in FIG. 1 is formed to reconstruct the filtered wave field by superposition of the quantities based on filtered wave-field components, and to provide a processed input signal, in response to which the reconstructed wave field can be generated by a plurality of discrete transmit means, such as loudspeakers. Preferably, the inventive means for reconstructing is formed to perform the already mentioned transformation 3 to reconstruct the filtered wave field by a Fourier-based transform of the filtered wave-field components.

Figure 2A:
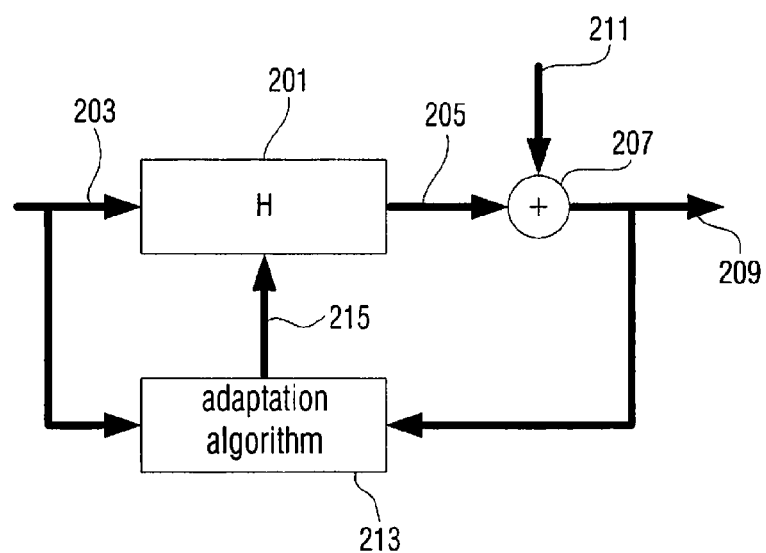
FIG. 2a is a block diagram of multidimensional adaptive filtering according to an embodiment of the present invention.

FIG. 2a shows an embodiment of an adaptive multidimensional filter, which can be used for filtering the wave-field components according to the invention.

Figure 20:
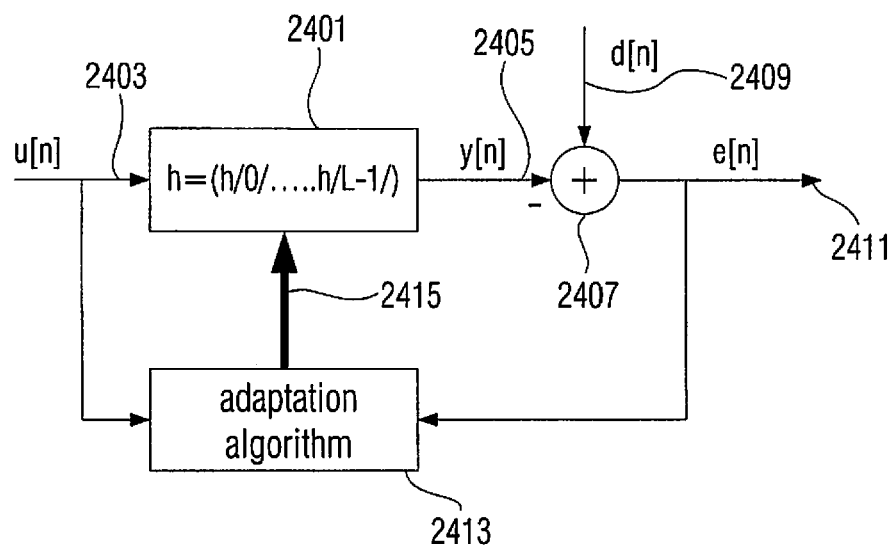
FIG. 20 is a basic block diagram of adaptive filtering according to the prior art.

The filter apparatus illustrated in FIG. 2a comprises a filter 201, which can be a multidimensional filter. In this case, the filter is characterized by a matrix of filter coefficients. Alternatively, the multidimensional filter 201 can consist of a series of single filters arranged adjacent to each other. The filter 201 has an input 203 as well as an output 205. The output 205 of the filter 201 is coupled to the adder 207, wherein the adder 207 has an output 209 as well as a further input 211. A means 213 for determining filter coefficients (adaptation algorithm) is disposed between the input 203 of the filter 201 and the output 209 of the adder 207. The means 213 for determining the filter coefficients has an output 215, to which the filter 201 is coupled. The multidimensional filter apparatus illustrated in FIG. 2a has a structure which has already been discussed in connection with the embodiment shown in FIG. 20. Depending on which locations the transformations 1, 2 or 3 are performed, the filter apparatus shown in FIG. 2a can be used to process the input signal.

Figure 2B:
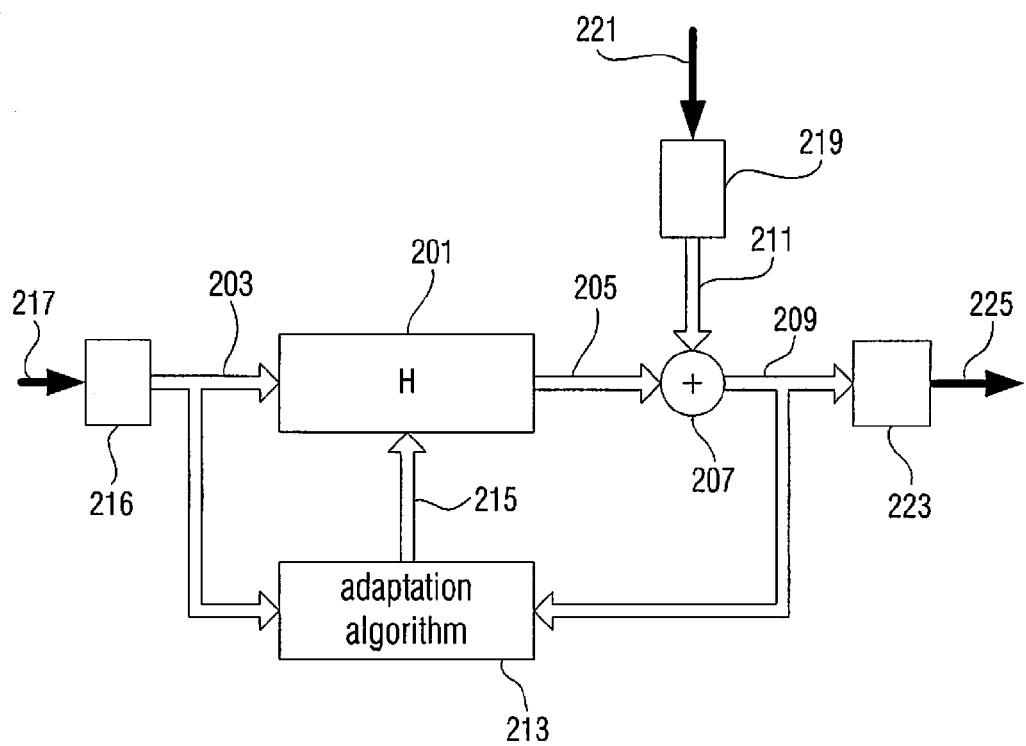
FIG. 2b is a block diagram of multidimensional adaptive filtering according to a further embodiment of the present invention.

FIG. 2b shows the filter apparatus illustrated in FIG. 2a with an inventive outer wiring.

In contrary to the embodiment shown in FIG. 2a, the apparatus illustrated in FIG. 2b has a transformation block 206 with an input 207 as well as an output, which is coupled to the input 203 of the filter apparatus 201. Above that, the filter apparatus illustrated in FIG. 2b has a transformation block 219 with an input 221 as well as an output coupled to the input 211 of the adder 207. Further, the filter apparatus illustrated in FIG. 2b comprises a transformation block 223 with an output 225 as well as an input, which is coupled to the output 209 of the adder 207.

In the following, the mode of operation of the filter apparatus illustrated in FIG. 2b will be explained.

In dependence on a respective functionality of the transformation blocks 216, 219 as well as 223, the filter apparatus illustrated in FIG. 2b can be used for filtering a received wave field. In that case, an input signal is applied to the input 217, which is associated to the receive apparatus. If the wave field is an acoustic sound field, for example, as has already been described, quantities can be applied to the input, which indicate directly the pressures and/or directly the sound velocities. In that case, the transformation block 216 is formed to determine the already mentioned transformation 2. Then, the excitation signals can be applied to the input 221. In that case, the transformation block 219 is formed, to perform the transformations 1a and 1. The filtered wave components are filtered after a possibly repeated determination of the filter coefficients by an adaptation algorithm, which the means 213 for determining filter coefficients performs. The filtered wave-field components are then subtracted from the reference wave-field components applied to the input 211 of the adder 207, and the result is output via the output 209. The transformation block 223 performs, for example, the transformation 3, to reconstruct the processed wave field from the processed wave-field components, which are applied to the output 209.

The transformation blocks 216, 219 or 223, respectively, can perform any transformation, such as transformation 1, transformation 2 or transformation 3, which has the effect that wave-field components of wave fields are applied to the inputs 203 and 211, and that a reconstructed wave field is output at the output 225.

FIG. 3 shows an embodiment of an adaptive filter apparatus according to the present invention. The adaptive filter apparatus comprises an adaptive filter 301 with an input 303 as well as an output 305. Further, the adaptive filter 301 has an adaptation input 307, which is coupled to an output 309 of an adder 311. The adder 311 has an input 313 as well as a further input coupled to the output 305 of the adaptive filter 301.

In the following, the mode of operation of the filter apparatus illustrated in FIG. 3 will be explained.

The adaptive filter 301 illustrated in FIG. 3 is formed to determine a vector of filter coefficients H(ke, n+1) starting from the previous vector of filter coefficients H(ke, n) by using the illustrated equation. $q_{LS}(\ )co, n)$ indicates the wave-field components to be filtered at the time n. Filtering the wave-field components is performed with filters having temporally finite impulse responses.

$$Q_{LS}(k_\Theta,n)=[q_{LS}(k_\Theta,n),q_{LS}(k_\Theta,n-1),\ldots,q_{LS}(k_\Theta,n-L+1)]^T$$

designates a vector of wave-field components of the respective L last discrete times. The vector at a time n has the same dimension as the vector of the filter coefficients. To determine the filter coefficients, the adaptive filter 301 is formed to perform the adaptation equation indicated in FIG. 3. $q_{out}(k_\Theta,n)$ indicates the processed wave-field components. $q_{mic}(k_\Theta,n)$ indicates the wave-field components of a receive wave field, such as tapped-off by microphones.

The filter coefficient vector at the next time is formed with the help of step width $\mu$, such as 1 1=0.01. The adaptation equation illustrated in FIG. 3 is based on the known LMS algorithm. Alternatively, an RLS algorithm or an FDAF algorithm or other known algorithms can be used as adaptation algorithms. For clarity reasons, the filter apparatus illustrated in FIG. 3 is only designed for a local mode $k_\Theta$. The column vector containing the estimated filter parameters describes temporal behavior of the considered local mode, which is addressed by the considered past coefficients. With a plurality of local modes, such as five modes, correspondingly, five wave-field components will have to be processed. According to an embodiment of the present invention, a multidimensional filter apparatus can comprise five apparatuses connected in parallel in the form as illustrated in FIG. 3. Alternatively, it is also possible that the wave-field components associated to different local modes are processed in series.

Figure 4:
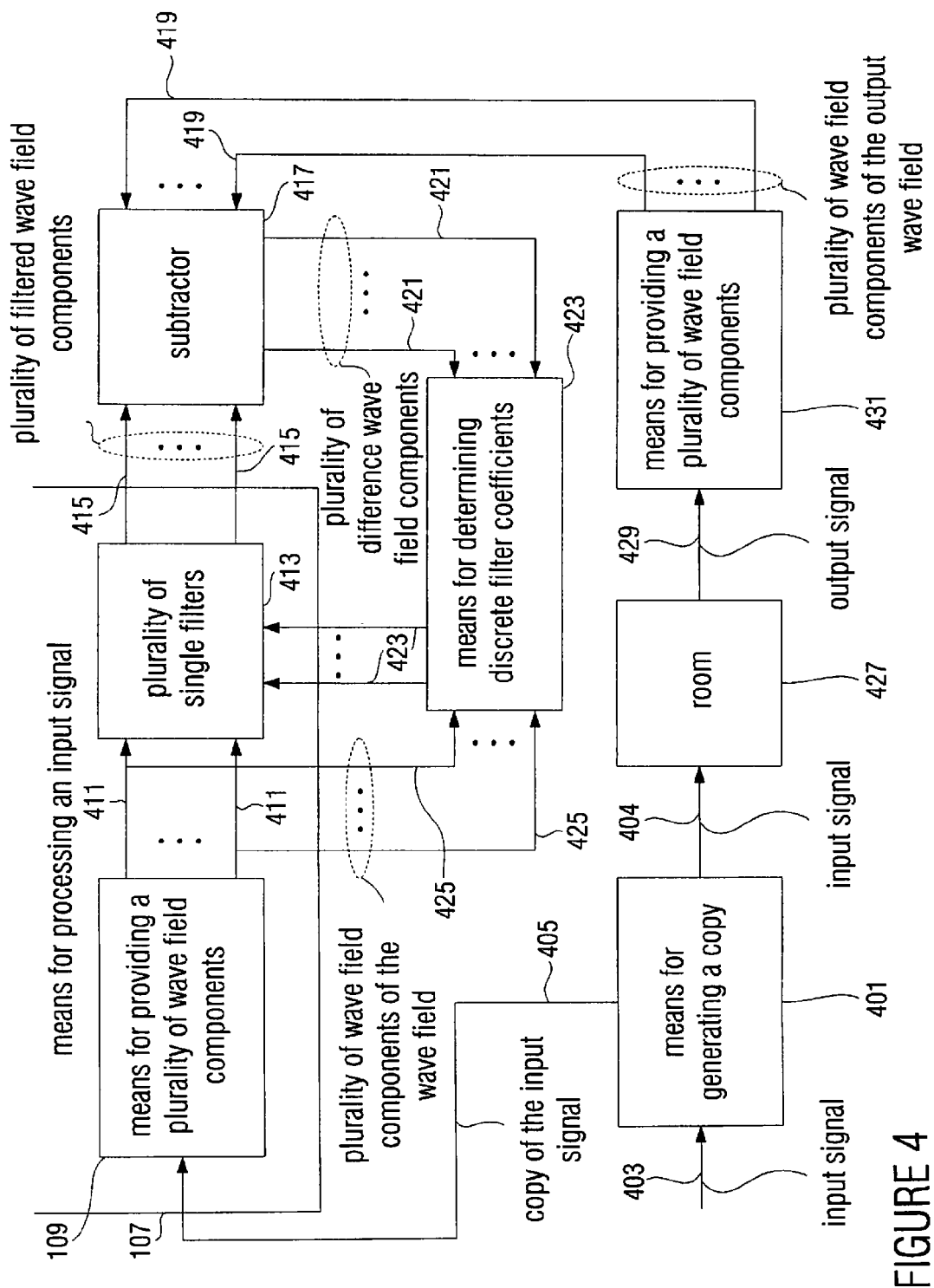
FIG. 4 is a basic block diagram of an apparatus for detecting a transmission characteristic of a room according to a first embodiment of the present invention.

FIG. 4 shows an embodiment of an inventive apparatus for detecting a transmission characteristic of a room during propagation of a wave field. The wave field can be an electromagnetic wave field or an acoustic sound field, which, in response to the input signal, can be generated by transmit means disposed at certain geometrical positions of the room and propagates in the room. A receive wave field is tapped off by receive means disposed at certain geometrical positions of the room, wherein the receive means generates an output signal in response to the receive wave field. The input signal for exciting the wave field has a plurality of subsignals associated to the discrete transmit means. The subsignal can, for example, be different excitation signals for the different transmit means. The output signal can, for example, comprise a plurality of output subsignals, wherein each of the output subsignals is associated to each receive means.

Figure 21:
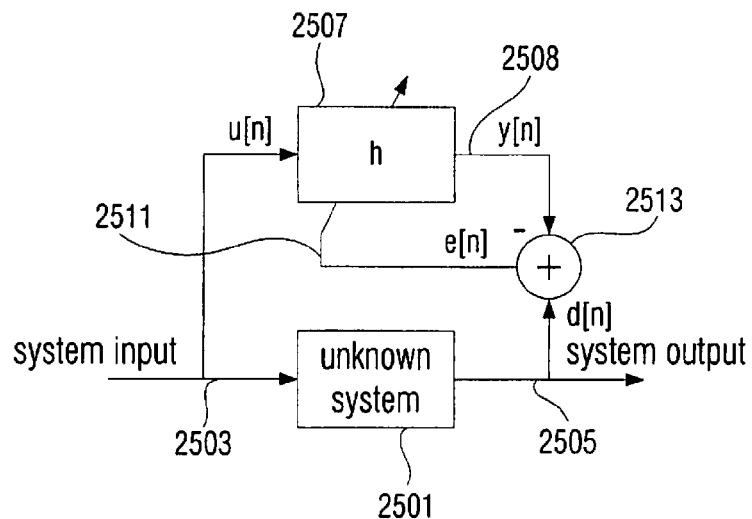
FIG. 21 is a basic block diagram of a system identification structure according to the prior art.
Figure 22:
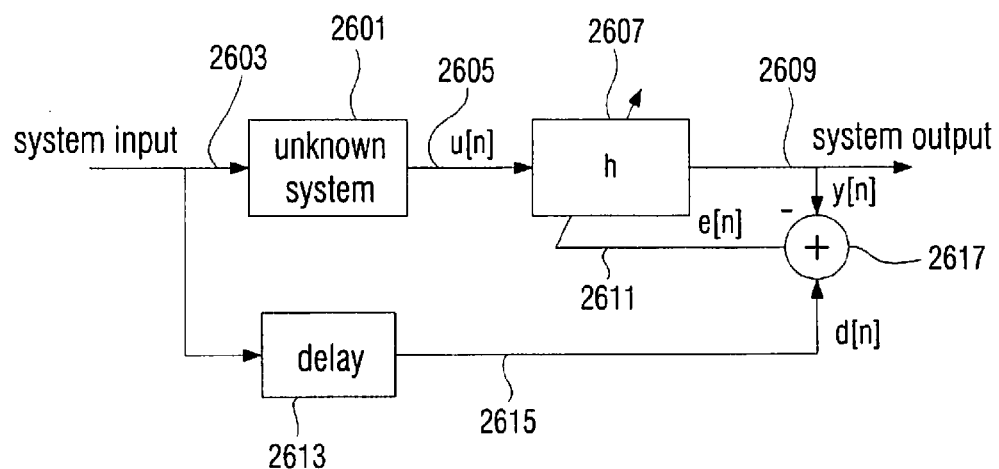
FIG. 22 is a basic block diagram for inverse modeling according to the prior art.
Figure 23:
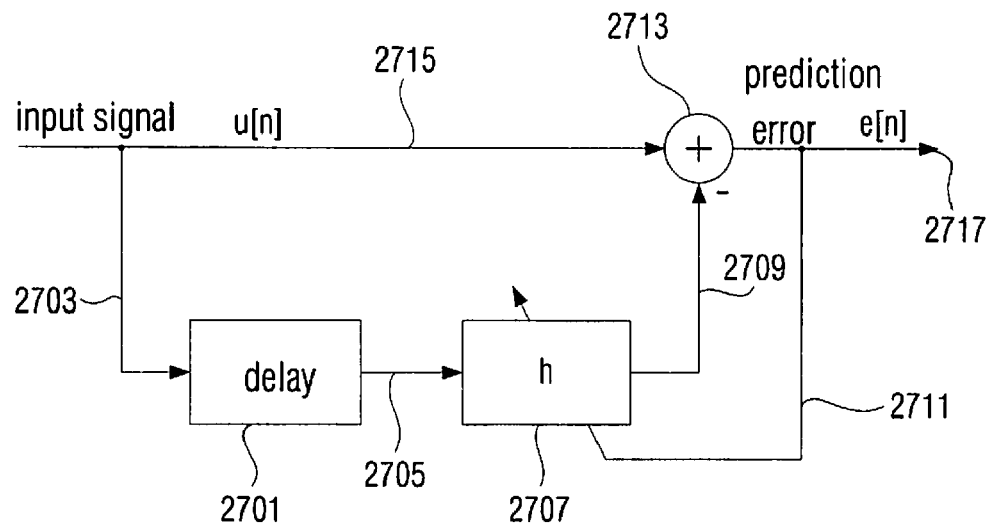
FIG. 23 is a basic block diagram for prediction according to the prior art.
Figure 24:
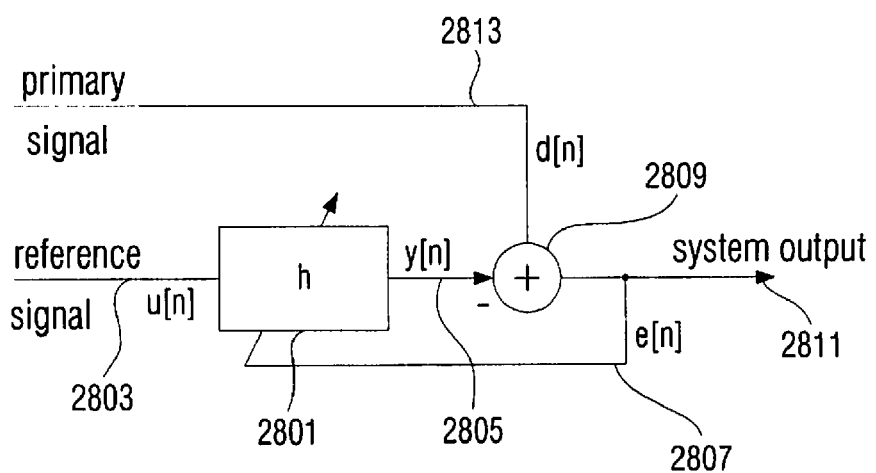
FIG. 24 is a basic block diagram for interference suppression according to the prior art.

The apparatus illustrated in FIG. 4 for detecting a transmission characteristic of a room has a structure based on the structure for system identification illustrated in FIG. 21. The apparatus illustrated in FIG. 4 is a means 401 for generating a copy. The means 401 for generating the copy can, for example, be a signal divider or signal branch. The means 401 for generating the copy has an input 403, a first output 405 as well as a second output 404. The first output 405 is coupled to an apparatus 407 for processing an input signal, wherein the means 407 has a structure as has already been discussed, for example in connection with the embodiment illustrated in FIG. 1. The apparatus 407 for processing the input signal illustrated in FIG. 4 comprises a means 409 for providing a plurality of wave-field components. The means 409 for providing the plurality of wave-field components has an input connected to the first output 405 of the means 401 for generating the copy. The means 409 for providing the plurality of wave-field components has further a plurality of outputs 411, wherein each of the outputs 411 is coupled to a single filter of the plurality of single filters. For clarity reasons, the plurality of single filters is combined in the embodiment shown in FIG. 4, and combined to a plurality 403 of single filters. The plurality of outputs 415 is coupled to a plurality of inputs of a subtracter 417, which can also be an adder. Further, the subtracter 417 has a plurality of further inputs 419. Above that, the subtracter 417 comprises a plurality of outputs 421.

The plurality of outputs 421 of the subtracter 417 is coupled to a plurality of inputs of a means 423 for determining discrete filter coefficients. The means 423 for determining discrete filter coefficients has further a plurality of further inputs 425, which is coupled to the plurality of outputs 411 of the means 409 for providing the plurality of wave-field components of the apparatus 407 for processing the input signal.

The second output 404 of the means 401 for generating the copy is coupled to one of the discrete transmit means not illustrated in FIG. 4, which are positioned in a room 427, whose characteristic is to be determined. The discrete transmit means can, for example, be positioned in a circular or linear way, as has already been mentioned. Further, a plurality of receive means not illustrated in FIG. 4 is positioned in the room 427, which are coupled to an output 429 of the room 427 (the unknown system). The output 429 of the room 427 is coupled to a means 431 for providing a plurality of wave-field components. The means for providing the plurality of wave-field components has a plurality of outputs, which is coupled to the further inputs 419 of the subtracter 417.

In the following, the mode of operation of the apparatus illustrated in FIG. 4 will be explained.

The means 409 and 431 for providing the plurality of wave-field components are formed to determine the wave-field components of the wave field or the receive wave field, respectively, based on the copy of the input signal or based on the output signal, respectively, as has already been explained. In response to the input signal, which is applied to the input 404 of the room, the wave field is generated, which propagates in the room. In response to the receive field detectable by the discrete receive means, an output signal is via the output 429 of the room, based on which the means 431 for providing the plurality of wave-field components determines the same. If the wave field is an acoustic sound field, the means 409 is formed to perform the transformations 1a and 1 or only transformation 1, respectively, which means to determine first the sound pressures and the sound velocities from the input signal exciting the transmit means, in order to analytically determine the wave-field components of the wave field, which is emitted, at any location of the room 427, based on the determined sound pressures and sound velocities. For tapping off the receive field, a microphone array is positioned in the room 427, wherein the microphones are formed to output direct sound pressures and/or sound velocities as output subsignals.

Based on these output sound pressures or sound velocities, respectively, the means 431 for determining the plurality of wave-field components performs the already described transformation 2.

The subtracter 417 is formed to determine a plurality of difference wave-field components and to provide the same via outputs 421 to the means 423 for determining discrete filter coefficients. The difference wave-field components are determined from a difference between the plurality of filtered wave-field components, which can be output via outputs 415 of the plurality of single filters 413, and the plurality of wave-field components of the output wave field, which can be output via the outputs 419 of the means 431 for determining the plurality of wave-field components. Further, those wave-field components, which can be provided by means 419 are available for the means 423 for determining discrete filter coefficients. The means 423 for determining discrete filter coefficients performs, for example, one of the possible minimization algorithms, as has already been described. As result of the algorithm, the filter coefficients determined in the respective adaptation step are provided via the outputs 433, which are each coupled to a filter of the plurality of single filters, to the same. By using the newly calculated filter coefficients, the wave-field components provided by the means 409 for providing the plurality of the wave-field components are filtered in the next step. With a full adaptation of the filter coefficients, the plurality of filtered wave-field components provided by the plurality of single filters corresponds to the plurality of wave-field components of the output wave field. In that case, the filter coefficients of the plurality of single filters describe the characteristic of the room, such as its transmission behavior with regard to wave propagation.

Based on the determined discrete filter coefficients, an equalization of the wave-field components can be performed, in order to reverse the influences of the room on the propagating wave field. Thereby, in contrary to conventional approaches, the wave-field components of the wave field are equalized. This can, for example, be an equalizer operating in the sense of the minimum mean error square.

For equalizing the wave-field components, an apparatus for equalizing can be used according to a further embodiment of the present invention, which equalizes the wave-field components of an output wave field based on the determined discrete filter coefficients. The equalized wave-field components are then superposed to an equalized wave field, which can be further processed.

The inventive concept according to FIG. 4 can also be used to perform a multidimensional acoustic echo cancellation (AEC) for full duplex communication systems based on an acoustic wave-field synthesis. In that case, the inventive apparatus for detecting a transmission characteristic of a room further comprises a means for reconstructing a wave field from difference wave-field components not illustrated in FIG. 4. The basic idea of echo cancellation is to digitally reproduce the echo paths consisting of loudspeakers, room and microphones, with the help of filter structures in order to avoid acoustic feedbacks (and thereby instability, i.e. feedback howling) across the room of the respective communication partner. Thus, the loudspeaker-room-microphone system represents the system to be identified, which is indicated by the room 427 in the embodiment illustrated in FIG. 4. The adaptive filter is excited by the loudspeaker signals and the estimated echo signals are subtracted from the microphone signals (output signals of the unknown systems), which contain the actual echoes. With an exact match of the model with the actual system, the echo in the microphone signals would be fully cancelled. According to the invention, an acoustic echo cancellation is realized multidimensionally for multichannel wave-field synthesis systems.

Figure 5:
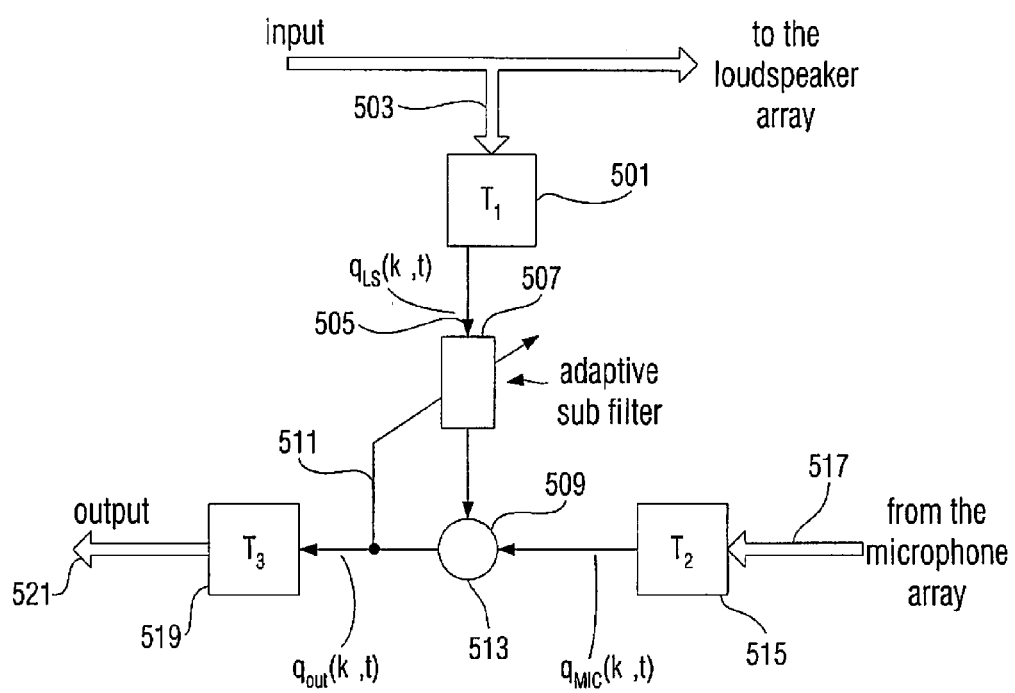
FIG. 5 is a basic block diagram of an inventive apparatus for echo cancellation.

FIG. 5 shows an embodiment of an inventive structure for acoustic echo cancellation. The structure illustrated in FIG. 5 has a transformation block 501 with an input 503 as well as an output 505. The output 505 is coupled to an adaptive filter 507. The adaptive filter 507 has an output 509 as well as an adaptation input 511. The adaptation input 511 is coupled to an output of a subtracter 513. The subtracter comprises an input coupled to the output 509 of the adaptive filter 507, as well as a further input coupled to a transformation block 515. The transformation block 515 has an input 517. The output of the adder 513 is further coupled to an input of a transformation block 519 having an output 521.

In the following, the functionality of the structure illustrated in FIG. 5 will be explained.

The input signals supplied to the loudspeaker array in order to excite the loudspeakers are supplied to the transformation block 501, which is formed to determine the wave-field components from the input signals, wherein, for example, the transformations 1a and 1 are performed. The wave-field components are then supplied to the adaptive filter 507, and adaptive filtering of the components is performed, as has already been discussed in connection with the embodiment illustrated in FIG. 3. The output signals coming from the microphone array are used for wave field decomposition in order to determine wave-field components of the received signal. Therefore, the transformation block 515 is used, wherein, for example, the above-described transformation 2 is performed. The processed wave-field components at the output of the subtracter 513, which can also be an adder, are supplied to the transformation block 519, which is formed to reconstruct the processed wave field, wherein, for example, the described transformation 3 is performed. The processed wave field is then present at the output 521.

The structure for acoustic echo cancellation illustrated in FIG. 5 can then be used to decouple the loudspeakers from the microphones. The echo cancellation is performed in the wave-field range according to the invention.

Figure 6:
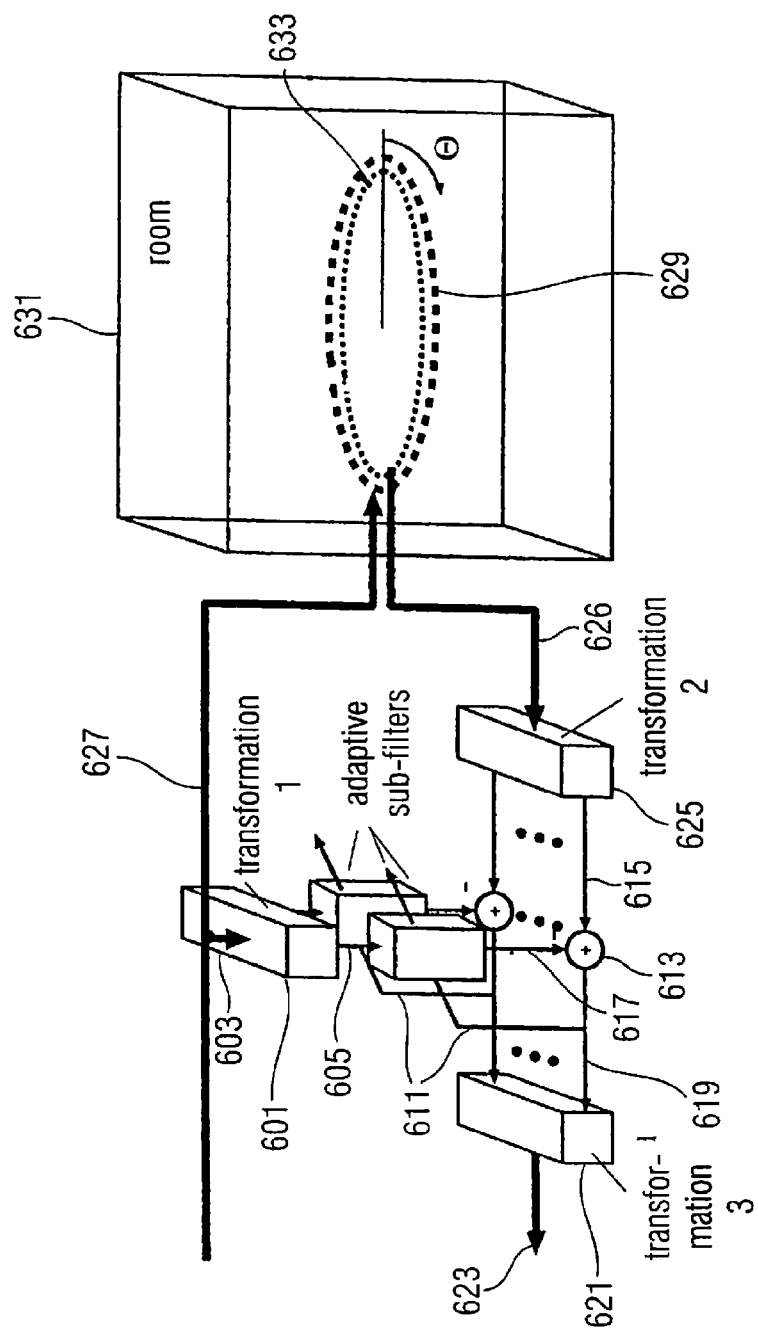
FIG. 6 is a further embodiment of an apparatus for echo cancellation.

FIG. 6 shows a further apparatus for acoustic echo cancellation according to a further embodiment of the present invention, wherein the structure illustrated in FIG. 6 is based on the inventive structure for acoustic echo cancellation already discussed in connection with FIG. 5.

The structure for echo cancellation illustrated in FIG. 6 has a transformation block 601 having an input 603 as well as a plurality of outputs 605. The plurality of outputs 605 is coupled to a plurality of adaptive subfilters 607, wherein each of the adaptive subfilters has an output 609 as well as an adaptation input 611. Each of the adaptive subfilters 609 is coupled to a subtracter 613, which can also be an adder. Each of the subtracters 613 has an input 615, an input 617, with which the output of the respective adaptive subfilter 607 is coupled, as well as an output 619. A transformation block 621 is coupled to the plurality of outputs 619 of the plurality of subtracters 613, which has an output 623.

Further, the embodiment illustrated in FIG. 6 has a transformation block 625, which has an input 626 as well as a plurality of outputs, which are coupled to the plurality of inputs 615 of the plurality of subtracters 613.

The input 603 of the transformation block 601 is coupled to a transmission path 627. The transmission path 627 is further coupled to a loudspeaker array 629, which is circularly positioned in a room 631. Further, a microphone array 633 is circularly disposed in the room 631, wherein the discrete receive means (microphones) provide an output signal, which is available for the transformation block 625 via the input 626.

The geometrical position of each transmit or receive means (loudspeaker or microphones, respectively) is determined by the angle $\Theta$ indicated in FIG. 6 and the respective radius, as long as all microphones and loudspeakers are on one level.

In the embodiment illustrated in FIG. 6, for clarity reasons, both circular loudspeakers and microphone arrays are assumed, so that an identification is performed in a level defined thereby. In order to fully detect the wave field (including directivity information), the microphone array consists preferably of specific microphones, so-called sound field microphones as are known from the paper D. S. Jagger, "Recent developments and improvements in soundfield microphone technology", Preprint 2064 of $75^{th}$ AES Convention, Paris, March 1984. These microphones provide both a pressure curve and the sound velocity on a circular line, wherein the sound field in this room can be reproduced exactly via wave-field synthesis at the other end of the telecommunication system, on which the embodiment illustrated in FIG. 6 is based. The sound field recorded by the microphone array contains also the echo originating from the loudspeaker array across the room, which is to be cancelled.

As has already been discussed, in the transformation blocks 601, 625 as well as 621 (transformation units), both the unreverberated field of the loudspeaker array and the reverberated field recorded by the microphone array are decomposed, for example into plane wave-field components, each propagating in different directions. Since in this example both arrays are circular, polar coordinates are suitable for a description. The plane wave-field components can be obtained in the wavenumber range via the angle O (so-called plane wave decomposition). Since these wave-field components are orthogonal to each other, they can be processed further independent of each other for different values of the wave number with regard to the angle across the arrays. Known single-channel adaptation algorithms, as have already been described, are now applied to the single wave-field components. The whole field cleared of loudspeaker echoes is finally again synthesized (reconstructed) in the transformation unit 621 from the individual wave-field components.

In deviation from the structure illustrated in FIG. 6, other variations for the acoustic echo cancellation for a wave-field synthesis are possible. For example, virtual source signals $S_i$ are applied to the input 603, so that first a wave-field synthesis is performed by using the already described transformation 1a. The transformation block 601 provides the required wave-field components from the signals obtained thereby, as has already been described.

Alternatively, a wave-field synthesis can be performed separately for output and for filtering. In that case, the transformation block 601 is extended by a wave-field synthesis.

According to a further embodiment of the present invention, wave-field components, which are, for example, plane wave-field components, already exist at the input 603. This case is of interest when an efficient transmission based on source coding is already used in the inventive transformation domain, such as can be the case in teleconference systems. If decomposed wave-field components are already applied at the input 603, the transformation block 601 is formed to transmit the wave-field components to the adaptive subfilters. Alternatively, the transformation block 601 can be omitted. The other transformations are performed as has already been described.

According to a further embodiment, the transformation block 621 can be omitted. If the transformation block 621 is omitted, an efficient transmission or storage can be performed, for example in the plane-wave range. The synthesis can then be performed only on the receive side of the transmission path or when reproducing the memory content.

Figure 7:
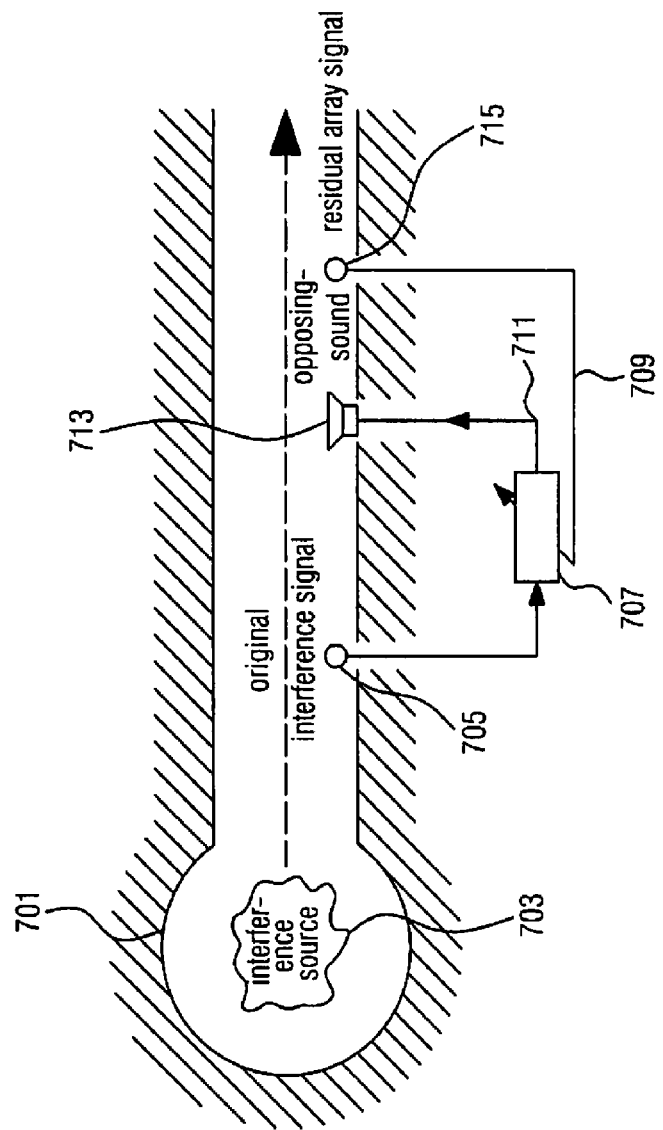
FIG. 7 is a basic system arrangement in an active sound suppression.

A further concept, which is traditionally also part of the discussed class of system identification methods, is a spatial active noise control (ANC). Therefore, for canceling an interference sound, adaptively, an opposing sound is generated, as indicated in FIG. 7. Thereby, an interference source 703 is within the room 701, which causes the interference sound. The original interference signal is received by a receive means 705, and a signal based thereon is supplied to an adaptive filter 707. The adaptive filter 707 has an adaptation input 709 as well as an output 711, wherein the output 711 is connected to a loudspeaker 713 for generating the opposing sound. A residual error signal is received by a further receive means 715, and a signal based thereon is applied to the adaptation input 709 of the adaptation filter 707. As illustrated in FIG. 7, a sound field propagates in the direction marked by the drawn arrow. Thereby, the filter is adapted for so long until an opposing sound is generated, which at best compensates the interference sound fully, so that the further receive means 715 can receive no signal in the ideal case.

According to a further embodiment of the present invention, active noise control can already be performed in the wave range.

Figure 8:
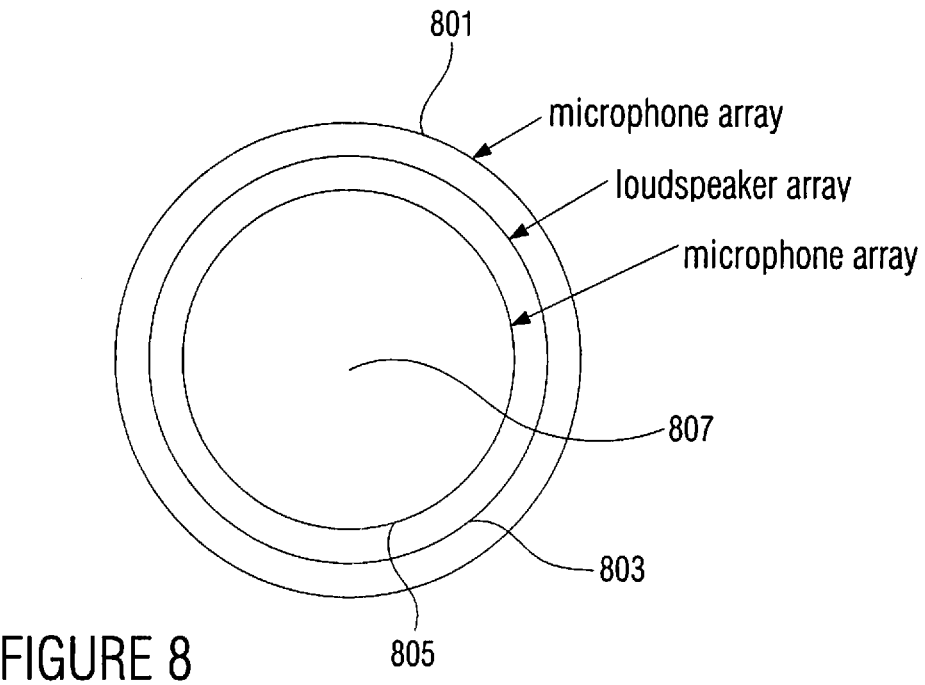
FIG. 8 is an embodiment of an arrangement of microphone and loudspeaker arrays according to a first embodiment of the present invention.

FIG. 8 illustrates an embodiment of an inventive arrangement of a microphone array 801, a loudspeaker array 803 as well as a microphone array 805. Thereby, the respective arrays are arranged in a circle. The microphone array 805 has the smallest radius. Around the microphone array 805, the loudspeaker array 803 is arranged in a circle. Around the loudspeaker array 803, the microphone array 801 with the largest radius is arranged in a circle. If an interference comes from outside, it is the aim to generate such an opposing sound that silence prevails within the inner region 807. According to the invention, multidimensional extension of active noise control is obtained by replacing the loudspeakers and microphones in FIG. 7 by the mentioned arrays. Adaptation is performed in the transformation range, as has already been shown in connection with echo cancellation. Thereby, the microphone array 801 provides a reference for an interference field. The microphone array 805 provides a field of the residual error.

Figure 9:
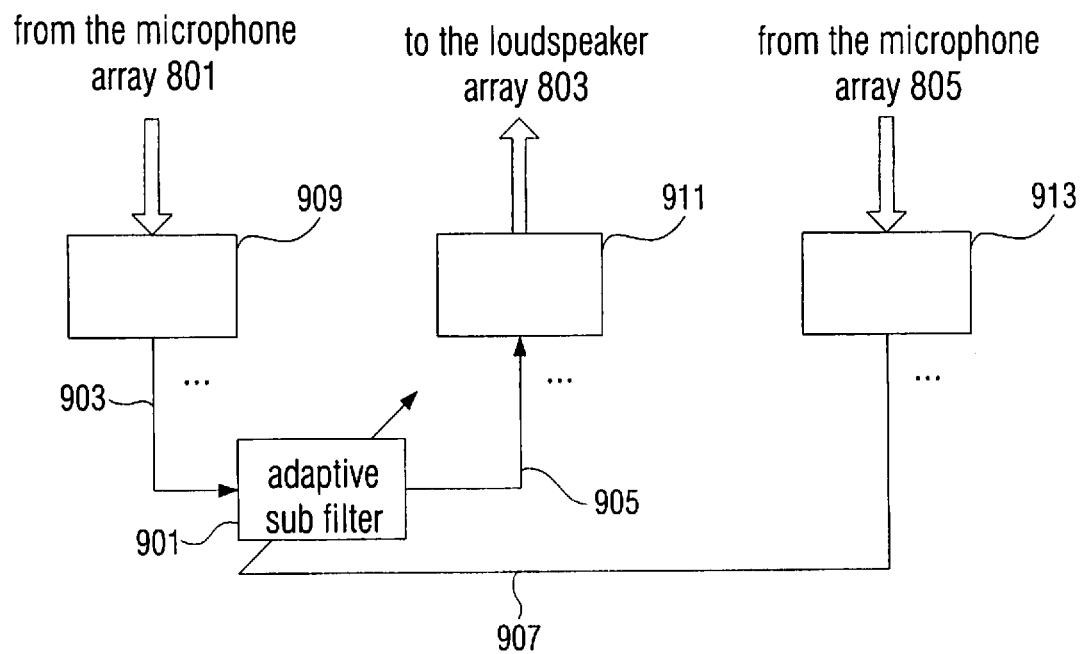
FIG. 9 is a basic block diagram of an inventive apparatus for active sound suppression according to a first embodiment of the present invention.

FIG. 9 shows a resulting structure for active noise control for the above-discussed case, wherein for simplicity reasons the structure for a wave-field component is illustrated.

The apparatus illustrated in FIG. 9 comprises an adaptive subfilter 901, which has an input 903 as well as an output 905. Further, the adaptive subfilter 901 has an adaptation input 907. The signals coming from the microphone array 801 are received from a transformation block 909, wherein the transformation block 909 is formed to provide wave-field components of the field received by the microphone array 801 to the input 903. The output 905 of the adaptive subfilter 901 is connected to a transformation block 911, which is formed to perform a reconstruction of the wave field based on a superposition of the wave-field components and to excite the loudspeaker array 803. In response to a receive field, the microphone array 805 provides an output signal to a transformation block 913, which is formed to determine wave-field components of the receive field tapped-off by the microphone array 805 and to provide the same to the respective adaptation input 907 of the adaptation subfilter. The adaptation subfilter is formed to perform an adaptation of the filter coefficients, as has already been discussed. If the filter is adapted, the loudspeaker array 803 is excited such that the interference coming from the outside is compensated in the inner region 807.

According to a further scenario, the interference comes from inside. It is the aim of the adaptation algorithm to generate such an opposing sound in the external region, i.e. in the region outside the microphone arrangement, that the interference is cancelled. According to the invention, the block diagram illustrated in FIG. 9 is mirrored, wherein the roles of the microphone arrays 805 and 801 are exchanged.

According to a further scenario, the interference comes both from inside and from outside. In this case, according to the invention, a parallel use of the block diagram illustrated in FIG. 9 and its mirrored version becomes necessary. In this case, processing incoming and outgoing wave-field components is required during recording and replay. In order to be able to differentiate the propagation directions, it is required that the respective microphone arrays measure both sound pressures and sound velocities (at least in normal direction).

Apart from system identification, inverse system modeling plays an important part, for example for filtering an output signal of a system. If the filter coefficients are equalizer coefficients, the same describe an inverse transmission characteristic of the considered system.

Figure 10:
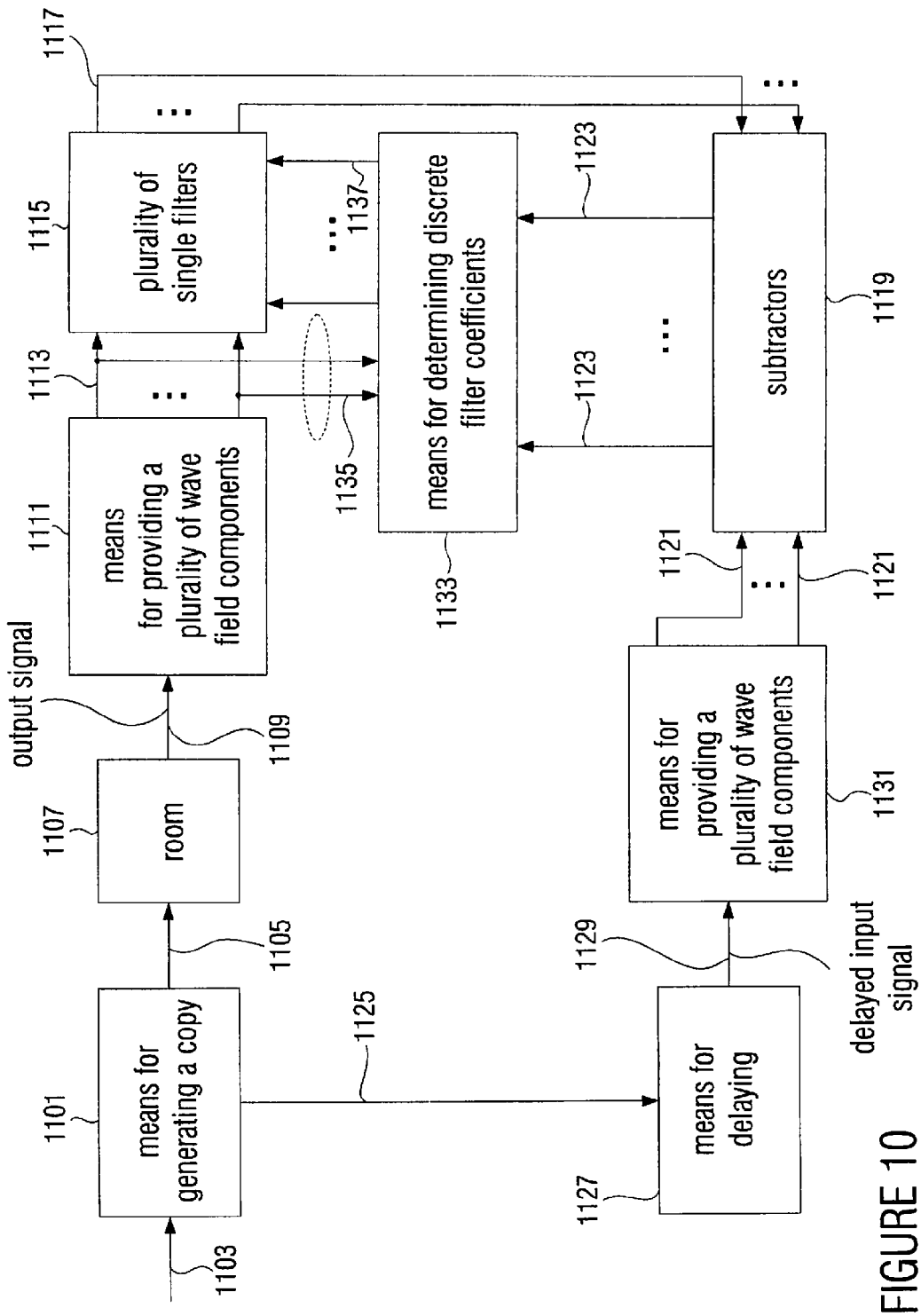
FIG. 10 is a basic block diagram of an inventive apparatus for detecting an inverse transmission characteristic of a room according to a first embodiment.

FIG. 10 shows an embodiment of an apparatus for detecting an inverse transmission characteristic of a room during propagation of a wave field, wherein the wave field is generated by discrete transmit means disposed at determined geometrical positions in response to an input signal. The wave field is propagating and a receive wave field is detected by receive means disposed at predetermined geometrical positions of the room, as has already been discussed. In response to the receive wave field, the receive means provide, an output signal which is considered as system output signal. The wave field can be an electromagnetic wave field or an acoustic wave field, as has already been discussed.

The apparatus illustrated in FIG. 10 shows a means 1101 for generating a copy of the input signal, which is applied to an input 1103 of the means 1101 for generating the copy. The means 1101 for generating the copy further has an output 1105, across which a plurality of discrete transmit means is controlled, which are disposed on a room 1107. In the room 1107, a plurality of discrete receive means are arranged, which are connected to an output 1109 where the output signal can be provided in response to the receive wave field. The output 1109 is coupled to a means 1111 for providing a plurality of wave-field components, wherein the means 1111 for providing the plurality of wave-field components has a plurality of outputs 113 coupled to a plurality of single filters 1115. The means 1111 for providing the plurality of wave-field components and the plurality of single filters 1115 result together in the already discussed apparatus for processing an input signal. The plurality 1115 of single filters or the plurality 1117 of outputs coupled to a plurality of inputs of a subtracter 1119, which can also be an adder. Further, the subtracter 1119 has a plurality of further inputs 1121 as well as a plurality of outputs 1123.

The means 1101 for generating the copy has a further output 1125, which is connected to an input of a means 1127 for delaying. The means 1127 for delaying has an output 1129, which is coupled to a means 1131 for providing a plurality of wave-field components. The means 1131 for providing the plurality of wave-field components has a plurality of outputs connected to the inputs 1121 of the subtracter 1119. The plurality of outputs 1123 of the subtracter 1119 is coupled to a plurality of inputs 1133 for determining discrete filter coefficients. The means 1133 for determining discrete filter coefficients has a plurality of further inputs 1135, which are coupled to the outputs 1113 of the means 1111 for providing the plurality of wave-field components. The means 1133 for determining discrete filter coefficients further has a plurality of outputs 1137, which are coupled to the plurality of single filters 1115.

The means 1101 for generating the copy can, for example, be a branching element providing exact copies of the input signal 1103 at the outputs 1105 and 1125. The means 1127 for delaying is in the lower branch of the apparatus illustrated in FIG. 10, which delays the copy of the input signal such that a signal delay in the upper branch of the apparatus illustrated in FIG. 10, consisting of the room 1107 of the means 1111 for providing the plurality of wave-field components as well as the plurality of single filters 1115, is equalized.

The subtracter 1119 generates reference wave-field components from the delayed wave-field components as well as the filtered wave-field components applied to the outputs of single filters, which are supplied to the means 1133 for determining discrete filter coefficients via the outputs 1123. The difference wave-field components are formed from a difference between the filtered wave-field components and the delayed wave-field components. The means 1133 for determining discrete filter coefficients is formed to adaptively determine the discrete filter coefficients from the difference wave-field components and the wave-field components provided by the means 1111 for providing the plurality of wave-field components, and to provide the discrete filter coefficients to the apparatus for processing the input signal (to the plurality of single filters 1115), wherein the discrete filter coefficients are the detected inverse transmission characteristic of the room. The adaptation of the filter coefficients is performed until the influence of the room on the wave-field coefficients of the receive wave field has been reversed by the plurality of single filters 1115.

Figure 11:
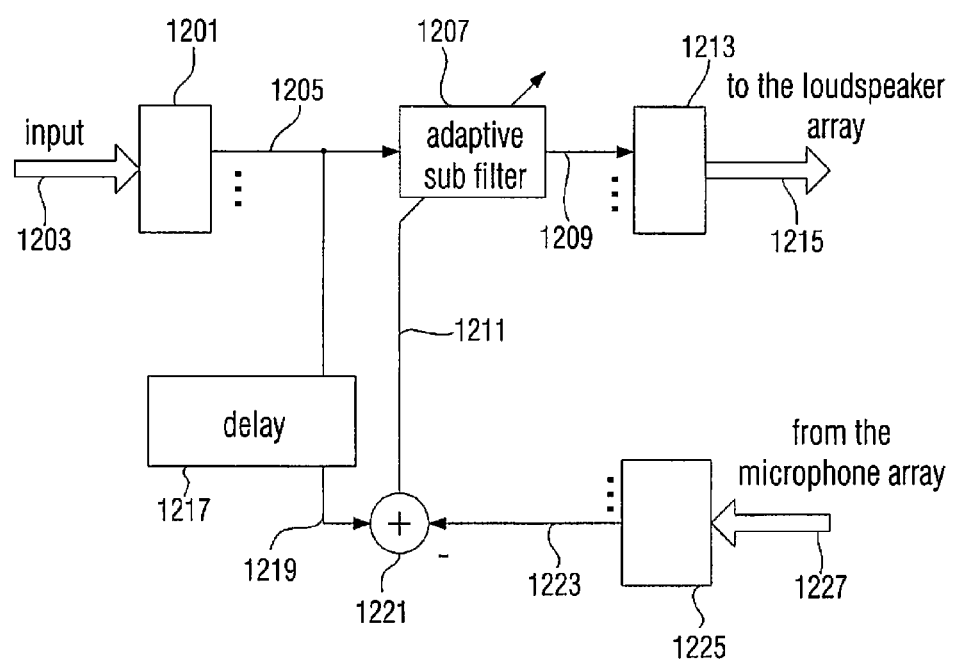
FIG. 11 is a further embodiment of an inventive apparatus for detecting an inverse transmission characteristic of a room.

FIG. 11 shows a further embodiment of an apparatus for inverse modeling, wherein for simplicity reasons the structure is illustrated only for one mode. The apparatus illustrated in FIG. 11 comprises a transformation block 1201 with an input 1203 and an output 1205. The output 1205 is coupled to an input of an adaptive subfilter 1207, which has an output 1209 as well as an adaptation input 1211. The output 1209 of the adaptive subfilter 1207 is coupled to a transformation block 1213, which has an output 1215.

The output 1205 of the transformation block 1201 is further coupled to an input of a delay member 1217, wherein the delay member 1217 has an output 1219, which is coupled to an input of a subtracter 1221, which can also be an adder. The subtracter 1221 further has a further input 1223, which is coupled to an output of a transformation block 1215, which has an input 1227. The output of the subtracter 1221 is coupled to the input 1211 of the adaptive subfilter 1207.

The functionality of the components illustrated in FIG. 11 has already been described in connection with the discussed embodiments. The transformation block 1201 performs, for example, the transformation 1, where wave-field components are derived from the input signal, which are supplied to the adaptive subfilter 1207. After filtering, the filtered wave-field components are supplied to the transformation block 1213, which performs a reconstruction of the wave-field components to generate a wave field, which is transmitted to a loudspeaker array in the form of an excitation signal. The delay element 1217 serves to balance the signal delays. A receive wave field detected by a microphone array is supplied to the transformation block 1225 as a received signal, which performs, for example, a transformation 2 and provides the wave-field components of the received wave field at the outputs. Then, the subtracter 1221 determines a difference between the delayed wave-field components as well as the wave-field components of the receive wave field and provides difference wave-field components to the adaptation inputs of the adaptive subfilters.

The signal provided by the microphone array serves, for example, to generate an error signal to drive an adaptation, so that the filter coefficients are determined correctly. The spatial equalization room compensation structure illustrated in FIG. 11 serves to modify the sound field emitted at a loudspeaker array such that for a listener, the influence of the replay room, e.g. in form of reflections at the walls, is minimized. The delay element 1217 generates a time delay of the wave-field components so that the adaptive system is causal.

In dependence on an arrangement of the transformation blocks, several variations of a room compensation are possible. If, for example, a loudspeaker signal is applied to the input 1203, the loudspeaker signals, as has already been discussed, are used to determine the wave-field components of the wave field to be emitted. For example, the transformation block 1213 performs the extrapolation of the wave field at the loudspeaker positions, as has already been described in connection with echo cancellation. The transformation block 1225 decomposes the microphone signals, as has already been described.

Alternatively, virtual sources can be applied to the input 1203, as has already been discussed. Thereby, the transformation block 1201 provides a decomposition of the virtual sources, as has already been described. The transformation blocks 1213 as well as 1225 do not change their functionality.

Alternatively, it is also possible that a decomposed wave field in the form of wave-field components is already applied to the input 1203. In that case, the transformation block 1201 can be omitted. However, the transformation blocks 1213 and 1225 maintain their functionality. Inverse modeling, as has already described, plays an important part in a multidimensional room compensation for acoustic replay systems, based on wave-field synthesis. Thereby, high-quality acoustic replay systems are to reproduce a recorded or synthetically generated sound field as realistically as possible. Compared to the reproduction system based on stereophonic principles, wave-field synthesis has many advantages. The theoretical approach of wave-field synthesis assumes a free room propagation of the loudspeaker signals. In real reproduction rooms, however, in most cases, these conditions are not given, during reproduction, every loudspeaker signal generates reflections at the walls of the reproduction room, which are not considered in the theoretical basics of the pure wave-field synthesis. These undesired portions in the sound field can cause distortions during reproduction. The basic idea of loudspeaker compensation is to use the existing loudspeakers also for cancellation of the acoustics of the reproduction room. Compared to classical methods of room compensation, which are known from the paper L. D. Fielder, "Practical limits for room equalization", Audio engineering society $110^{th}$ convention, New York, September 2001, the wave-field synthesis offers the possibility to perform a room compensation for a large spatial audible range.

In the practical implementation, the desired wave field is compared to a measured real present wave field to adapt compensation filters, which corresponds to inverse modeling. Here, the already mentioned problems with regard to the effort and the convergence properties during adaptation of the compensation filters apply as well.

Figure 12:
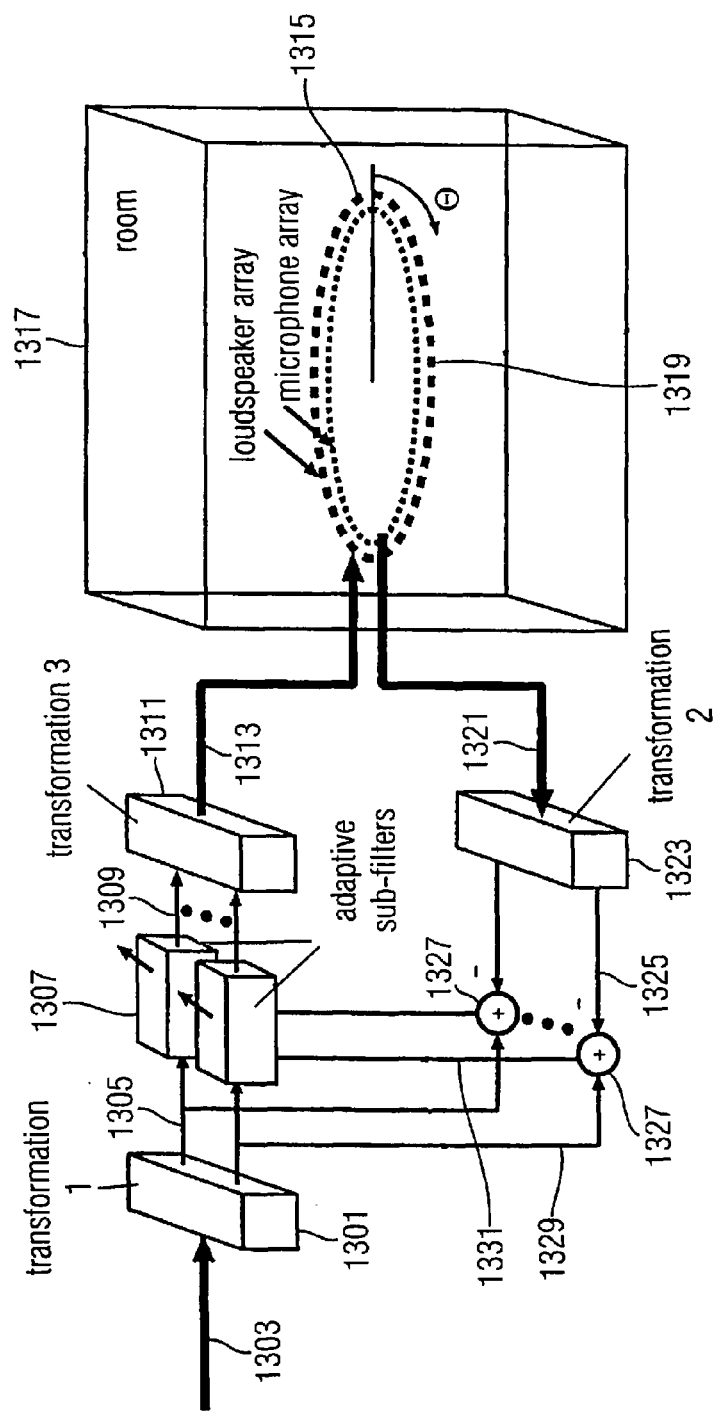
FIG. 12 is a block diagram of an inventive arrangement for multidimensional acoustic room cancellation.

FIG. 12 shows an embodiment of an apparatus for acoustic room compensation.

The apparatus illustrated in FIG. 12 has a transformation block 1301, which has an input 1303 as well as plurality of outputs 1305. Each of the outputs 1305 is coupled to an adaptive subfilter 1307, wherein the number of outputs of the respective filter is coupled to a plurality of inputs 1309 of the transformation block 1311. The transformation block 1311 has an output 1313, which is coupled to a loudspeaker array 1315, which is disposed in a room 1317.

Further, a microphone array 1319 is disposed in a room 1317, which has an output, which is coupled to an input 1321 of the transformation block 1323. The transformation block 1323 has a plurality of outputs 1325, which are coupled to a plurality of subtracters 1327, which can also be adders. Further, the plurality of subtracters 1327 has a further input 1329, which is coupled to a respective adaptation input 1331 of a respective adaptive filter 1307. Delay members can also be disposed between the inputs 1329 and the subtracters 1327.

The means illustrated in FIG. 12 have a structure as has already been described in connection with the above-discussed embodiments. It is the task of the adaptive filter 1307 to filter the wave-field components provided by the transformation block 1301 (transformation 1), such that the room influence just compensates the characteristic introduced by the adaptive filter 1307, so that the wave-field components coming from the transformation block 1323 performing the transformation 2 correspond to the original wave-field components.

The apparatus illustrated in FIG. 12 shows an efficient realization of a room compensation with the already described techniques for techniques for signal processing according to the present invention. First, the desired wave field is, for example, decomposed into plane wave field components. The room compensation filters 1307 operate then independent of each other on these plane wave-field components, which are ideally orthogonal to each other. Then, the loudspeaker signals are obtained from the filtered plane wave-field components according to the geometry of the loudspeaker array 1315. In this embodiment, the used loudspeaker array 1315 and the microphone array 1319, which is used for analyzing the room influence, are circular. By efficient implementation, the measured signal can be decomposed again into plane wave-field components from the microphone signals, for example by using the transformation 2. By comparing the desired wave field in this area with the really measured wave field, the compensation filters 1307 can be efficiently adapted. In this case, by an orthogonality of the wave-field components, single-channel adaptation algorithms can be used again, as has already been described, so that an efficient multidimensional acoustic room compensation can be performed.

According to a further aspect of the present invention, the inventive concept can be used in prediction structures.

Figure 13:
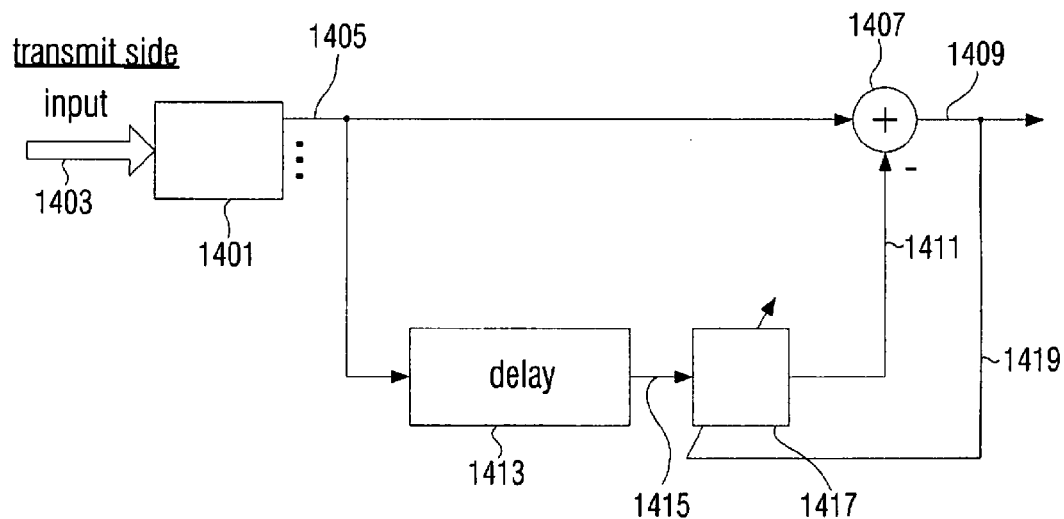
FIG. 13 is a basic block diagram of an inventive apparatus for generating a prediction error signal.

FIG. 13 shows a first embodiment of a prediction apparatus with a transformation block 1401 having an input 1403 as well as an output 1405. The output 1405 is coupled to a subtracter 1407, which can also be an adder. Further, the subtracter 1407 has an output 1409 as well as a further input 1411. The output 1405 of the transformation block 1401 is further coupled to a delay member 1413, which has an output 1415, which is coupled to an adaptation filter 1417. The adaptation filter 1417 has an output coupled to the further input 1411 of the subtracter 1407, as well as an adaptation input 1419 connected to the output of the subtracter 1407. The transformation block 1401 is, for example, formed to use the signal applied to the input 1403, which, for example, characterizes a wave field to be emitted, for decomposing the wave field to be transmitted into wave-field components. The input signals are the loudspeaker contents to be replayed on the transmitter side or recording channels of a microphone array. If the wave field is an acoustic sound field, as has already been mentioned, information about the sound pressure distribution and the sound velocity can be obtained from the input signal. Thereby, transformation block 1401 performs a decomposition of the wave field into spatially orthogonal components, as has already been described in the case of echo cancellation. If the input signal comprises an information carrying portion (information portion) and a redundancy, which is predictable, it is the aim of the filter adaptation to filter the delayed wave-field components at the output of the delay member 1413, such that after a subtraction performed in a subtracter 1407 a signal occurs at the output 1409, which in the ideal case only comprises the information portion. This signal 1419 (prediction error signal) is further used to control an adaptation of the adaptive filter 1417.

On the receiving side, all components of the prediction error signal are detected and an output signal is filtered such that the prediction performed in the transmitter is reversed, i.e. that the original signal is composed of the received signal of the non-predictable information portion and the predictable redundancy.

Figure 14:
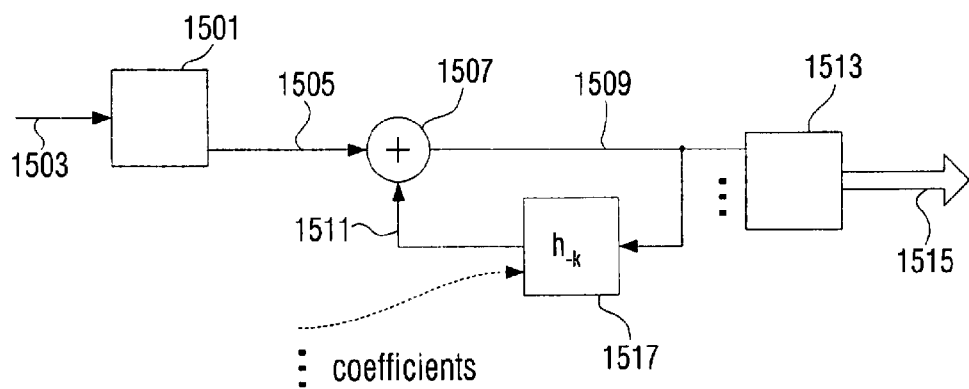
FIG. 14 is a basic block diagram of an inventive apparatus for retrieving a useful signal from an input signal according to a first embodiment of the present invention.

FIG. 14 shows an apparatus for retrieving a signal from a received prediction error signal. The apparatus illustrated in FIG. 14 shows a transformation block 1501 with an input 1503 and an output 1505. The output 1505 is coupled to an adder 1507, which has an output 1509 as well as a further input 1511. The output 1509 of the adder 1507 is coupled to an input of a transformation block 1513, which has an output 1515. Further, an adaptive filter 1517 is coupled to the output 1509 of the adder 1507, which has an output, which is connected to the further input 1511 of the adder.

A received signal applied to the input 1503 is used to possibly decompose an underlying receive wave field into wave-field components. The wave-field components applied as received signal are supplied to an adder, which performs an addition of the wave-field components of the receive wave field and the filtered components at the output of the adaptive filter 1517. Thereby, the adaptive filter 1517 processes the composite wave-field components, which are provided at the output of the adder 1507. When the apparatus illustrated in FIG. 14 performs an operation inverse to the apparatus illustrated in FIG. 13, the adaptive filter 1517 is formed to receive the filter coefficients, as indicated in FIG. 14, to perform the filtering. The filter coefficients are then the adaptively set filter coefficients from the filter of FIG. 14. The transformation block 1513 performs, for example, the transformation 3 to perform an extrapolation, as has already been described in the context of echo cancellation. In that case, a composite reconstructed wave field is present at the output 1515.

As a variation of the forward prediction illustrated in FIG. 14, backward prediction can be used. Therefore, analogous to FIG. 13, the backward prediction is used, such as it is explained, for example, in B. Sklar, "Digital Communications", Prentica Hall, Englewood Cliffs, N.J., USA, 1988, for every wave-field component individually after the transformation unit 1401.

The apparatuses illustrated in FIGS. 13 and 14 represent the signal processing at the example of a mode (a wave-field component). A multidimensional extension is possible, wherein the apparatuses illustrated in FIGS. 13 and 14 are multiplied and associated to every mode.

As has already been mentioned, the input signal already discussed in FIG. 13 comprises an information portion and a redundancy portion, wherein the prediction error signal to be provided is to comprise only the information portion. In response to the prediction error signal, a wave field is generated by discrete transmit means disposed at predetermined geometrical positions, wherein the wave field can be an acoustic sound field or an electromagnetic field. According to a further embodiment of the present invention, the means illustrated in FIG. 13 comprises, in the multidimensional extension of a means for generating a copy of the input signal, a means for providing a plurality of wave-field components from the input signal, a means for delaying the copy of the input signal as well as a means for processing the delayed copy of the input signal and for providing a plurality of filtered wave-field components from the delayed copy of the input signal. The apparatus for processing the delayed copy has, for example, a structure as has already been discussed several times. Above that, the inventive apparatus comprises a subtracter for generating a plurality of difference wave-field components from a difference between the plurality of wave-field components and the plurality of filtered wave-field components. The subtraction operation can also be performed by an adder, wherein the respective wave-field components are provided with an opposite sign. The inventive apparatus for generating a prediction error signal further comprises a means for determining discrete filter coefficients, wherein the means for determining discrete filter coefficients is coupled to the apparatus for processing the input signal, as has already been discussed. The means for determining discrete filter coefficients is further formed to receive the wave-field components derived from the apparatus for processing the input signal. The inventive means for determining discrete filter coefficients is further coupled to the plurality of single filters of the apparatus for processing the input signal to provide the discrete filter coefficients. The means for determining discrete filter coefficients is formed to provide the discrete filter coefficients from the plurality of difference wave-field components and the plurality of wave-field components associated to the delayed received signal, to generate the prediction error signal by suppressing the redundancy portion during filtering. The prediction error signal can already consist of the filtered wave-field components. Alternatively, however, it is possible that the prediction error signal is used for reconstructing a wave field, wherein in that case the reconstructed wave field is the prediction error signal.

In response to the prediction error signal, an output wave field is generated by discrete transmit means disposed at predetermined geometrical positions of a room. The output wave field propagates in the room, so that a receive wave field can be detected by a plurality of receive means disposed at predetermined geometrical positions of the room. In response to the receive wave field, the receive means provides an input signal, from which a useful signal comprising an information portion and a redundancy portion is to be reconstructed, as has already been discussed in context with the apparatus illustrated in FIG. 14.

According to a further embodiment, the inventive apparatus for retrieving a useful signal comprises an apparatus for processing the input signal, as has already been discussed. The apparatus for processing the input signal has a means for providing wave-field components, as is already been discussed. The means for providing the wave-field components is connected to a summer, which is formed to add the plurality of wave-field components and the plurality of the filtered wave-field components provided by the plurality of single filters, and to provide the added plurality of wave-field components to the plurality of single filters for filtering, wherein the plurality of single filters is formed to filter the added wave-field components by using the discrete filter coefficients that have already been used for generating a prediction error signal. The discrete filter coefficients can be provided by a means for providing filter coefficients. The means for providing the filter coefficients can, for example, be formed to receive the filter coefficients from a transmitter, wherein a prediction has been performed, as it is always the case in connection with using prediction structures. In this embodiment, the added plurality of wave-field components represents the retrieved useful signal.

As has already been mentioned, the inventive concept can also be used for interference suppression or generally for suppressing interference signals. If, for example, a useful wave field is emitted from transmit means disposed within a room, it can be interfered by an interference wave field superposed to the useful wave field. The interference wave field can, for example, be generated by an interference transmitter, which is disposed in the room. The interference transmitter can, for example, be an extraneous transmit means, which also emits wave fields. Due to the superposition of the useful wave field signal and the interference wave field, an interfered receive wave field occurs, which can be tapped off by discrete receive means disposed within the room. As has already been described, a received signal, which comprises an interference portion and a useful portion, is generated in response to the receive wave field. It is the aim of interference suppression, to minimize the interference portion.

Figure 15:
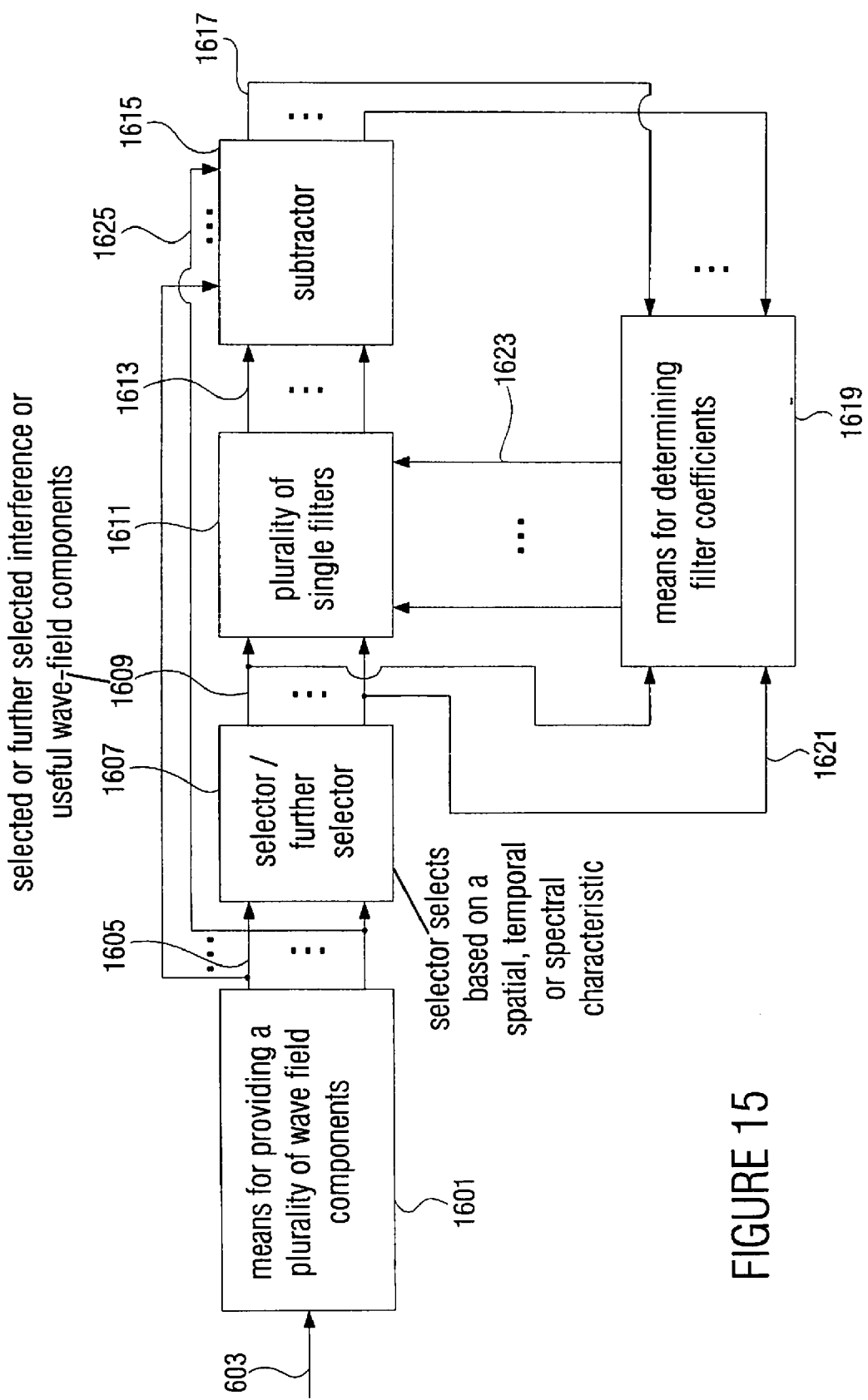
FIG. 15 is a basic block diagram of an inventive apparatus for suppressing an interference portion in a received signal to a first embodiment of the present invention.

FIG. 15 illustrates an embodiment of an apparatus for suppressing an interference portion in a received signal comprising an interference portion and a useful portion. The apparatus illustrated in FIG. 15 comprises a means 1601 for providing a plurality of wave-field components having an input 1603 as well as a plurality of outputs 1605. The plurality of outputs 1605 are coupled to a plurality of inputs of the selector 1607, wherein the selector 1607 has a plurality of outputs 1609. The plurality of outputs 1609 is coupled to a plurality of single filters 1611. The plurality of single filters 1611 has a plurality of outputs 1613, which are coupled to a plurality of inputs of a subtracter 1615. The subtracter has a plurality of outputs 1617, which are coupled to a plurality of inputs of the means 1619 for determining filter coefficients. The means for determining filter coefficients has further a plurality of further inputs 1621, which are coupled to the plurality of outputs 1609 of the selector 1607. The means 1619 for determining filter coefficients has further a plurality of outputs 1623, which are each coupled to one of the plurality of single filters 1611. The means illustrated in FIG. 15 have a structure as has already been explained in connection with the already discussed embodiments. Particularly, the means 1601 for providing the plurality of wave-field components as well as the plurality of single filters 1611 is part of an apparatus for providing a processed input signal, as has already been discussed, for example in connection with the embodiment illustrated in FIG. 1. The selector 1607 can, for example, be integrated into the means for providing. A received signal is applied to the input 1603, which has been generated by the plurality of discrete receive means in response to the interfered receive wave field. The means 1601 for providing the plurality of wave-field components is formed to provide the wave-field components of the received signal. The wave-field components of the received signal comprise the useful wave-field components, which can be associated to geometrical positions, where the discrete transmit means are disposed, as well as the interference wave-field components, which can be associated to geometrical positions within the room, where, for example, interference sources are disposed. The selector 1607 is formed to select the interference wave-field components to generate an estimation of the interference wave-field components. Particularly, the selection can take place time, room and frequency selective, for example based on the known further geometrical positions of the room, e.g. a positioning angle of the interference transmitters. After filtering by the plurality of single filters, the selected interference wave-field components are supplied to the subtracter 1615. Thereby, the subtracter forms a difference between the filtered interference wave-field components and the wave-field components comprising both interference wave-field components and useful wave-field components. The wave-field components provided by the means 1601 for providing the plurality of wave-field components are applied to a plurality of inputs 1625 of the subtracter 1615. Thus, the subtracter 1615 subtracts a filtered estimation of the interference wave-field components from the wave-field components of the receive wave field. Thus, in the ideal case, which means in a full adaptation of the filter coefficients, wave-field components, which only consists of the useful wave-field components, are provided at the output of the subtracter. The means 1619 for determining filter coefficients is formed to set the filter coefficients adaptively such that the selected interference wave-field components are filtered such that they can be suppressed by forming a difference.

Thus, an adaptive filter consisting of a plurality of single filters and the means for determining filter coefficients generates an estimation of the interference signal, which is for example subtracted from the mixture of useful and interference signals as a reference signal.

Figure 16:
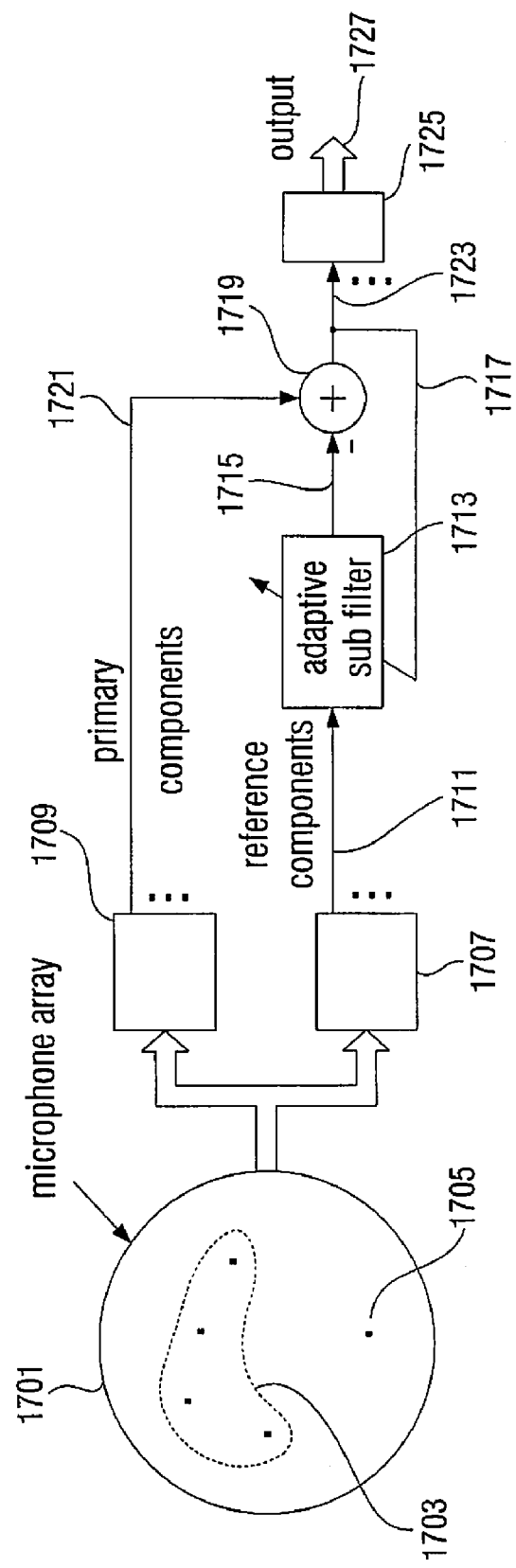
FIG. 16 is a further embodiment of an inventive apparatus for suppressing an interference portion.

According to a further embodiment of the present invention, the signals representing the mixture of useful and interference signals as well as the estimation of the interference portion, can be interchanged. FIG. 16 shows a further embodiment of an inventive apparatus for suppressing an interference portion.

FIG. 16 shows a room 1701 in which discrete transmit means 1703 are disposed at geometrical positions. A source 1705, whose wave-field components are to be suppressed, is at a further geometrical position in the room 1703. A plurality of receive means not shown in FIG. 16 detects a receive wave field, and generates an output signal in response to the detected receive wave field, which is supplied both to a transformation block 1707 and a transformation block 1709.

The transformation block 1707 has an output 1711 coupled to an input of an adaptation subfilter 1713. The adaptation subfilter has an output 1715 as well as an adaptation input 1717. The output 1715 of the adaptation subfilter 1717 is coupled to an input 1721 of a subtracter 1719. The subtracter 1719 further comprises another input to which an output of the transformation block 1709 is coupled. The output 1723 of the subtracter 1719 is coupled both to the adaptation input 1717 of the adaptation subfilter and to an input of a transformation block 1725 having an output 1727.

The transformation blocks 1709 and 1707 are formed to determine the wave-field components of the receive wave fields from the input signal.

The discrete transmit means 1703 (the desired sources) generate a wave field which is to be maintained. Therefore, wave-field components generated by the transformation block 1707 (reference components) are subtracted from the wave-field components, which have been generated from the transformation block 1709, after filtering by the adaptive subfilter 1713. Wave-field components occur at the output of the subtracter 1719, which are in the ideal case freed from the interference wave-field components. After optional reconstruction of the wave-field components by the transformation block 1725, a signal occurs, which can, for example, be stored or further processed.

The transformation blocks 1709 or 1707, respectively, are formed to perform the already described transformation 1 or transformation 2, respectively. According to a further aspect of the present invention, the transformation block 1707 can be formed to additionally perform spatial filtering of the wave-field components, to, for example, only take over the components which contain the sources to be removed, in dependence on the angle $\Theta$. Instead of spatial filtering, a secondary condition can be considered directly during adaptive filtering, so that, for example, the already described selection takes place in the adaptive subfilter. The transformation block 1725 can perform the already described transformation 3. Alternatively, all wave-field components can be summed up in a weighted way.

According to a further embodiment of the present invention, the upper branch illustrated in FIG. 16 and providing the primary components can be omitted. In that case, the subtracter 1719 is also not required. The interference components are removed by performing, for example, a spatial filtering by the transformation block 1707, where the interference components are suppressed. Alternatively, in adaptive filtering, a secondary condition can be inserted, for example in the form of an angle $\Theta$, indicating the structure of the interference sources, so that, for example, only the interference wave-field components are taken out from the wave-field components of the receive wave field.

Figure 17:
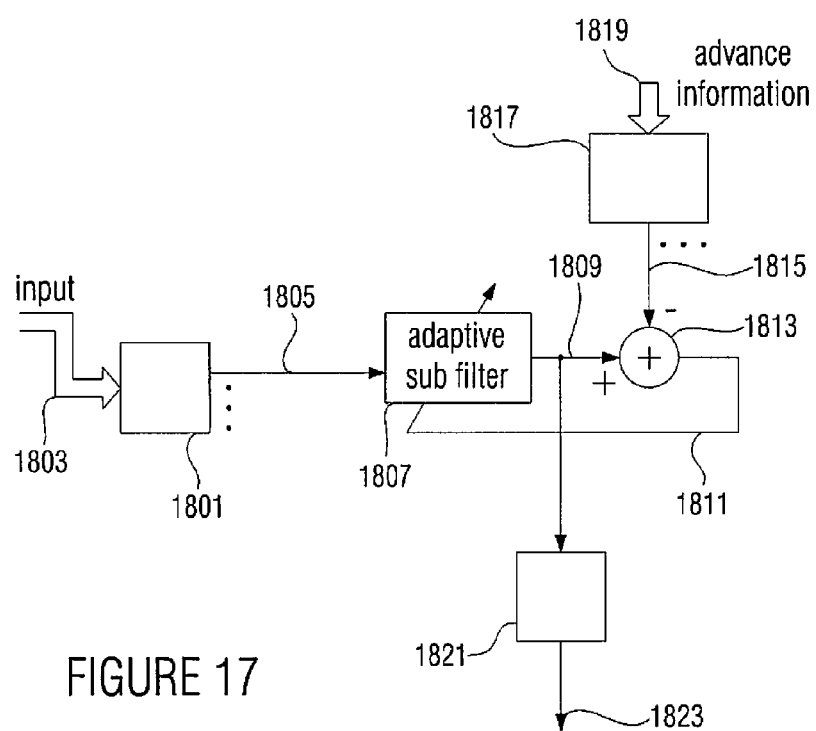
FIG. 17 is a further embodiment of an inventive apparatus for suppressing an interference portion.
Figure 19:
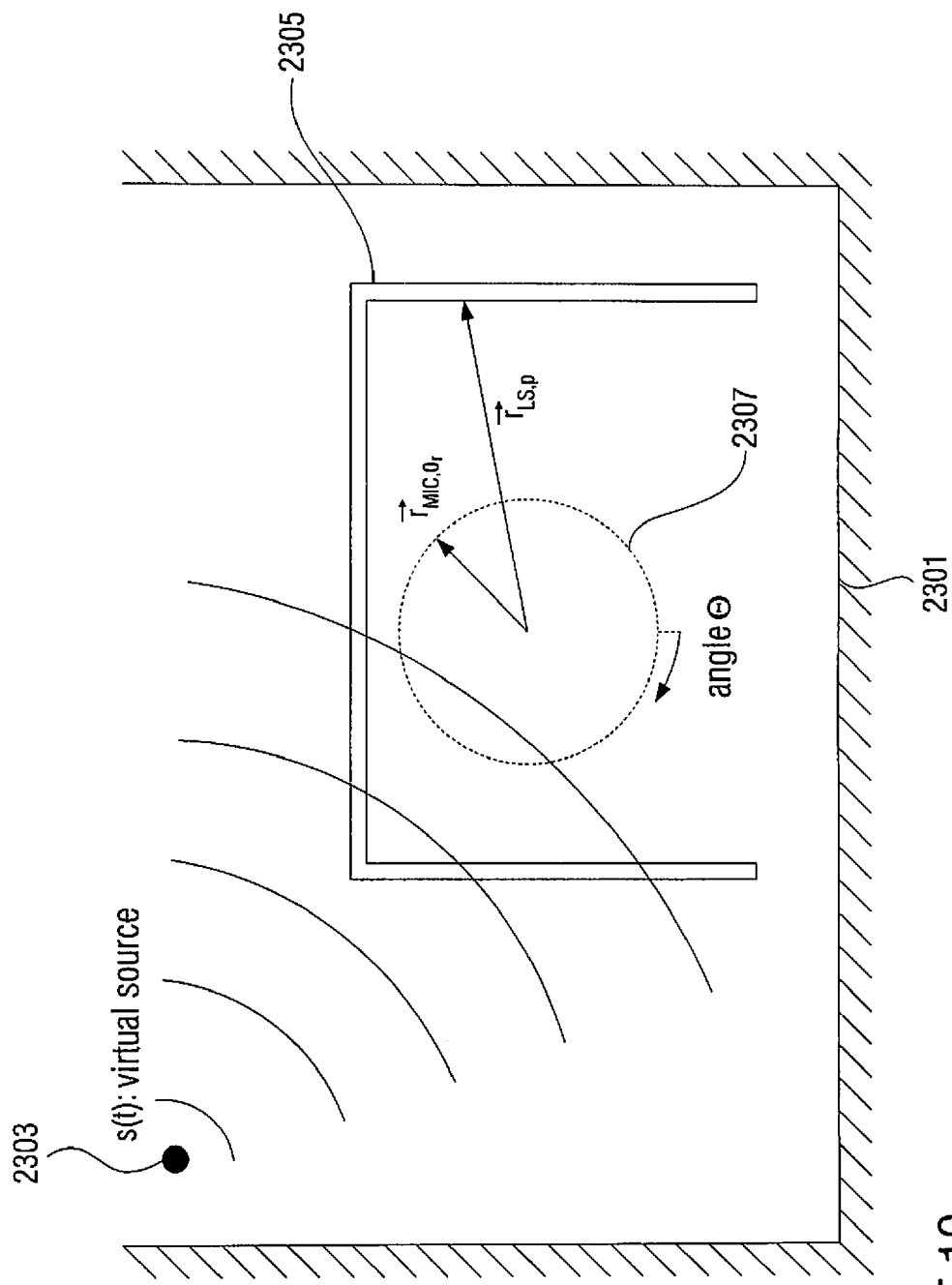
FIG. 19 is an embodiment of an inventive arrangement of loudspeakers and microphones in a room.

FIG. 17 shows a further embodiment of an apparatus for interference suppression. The apparatus illustrated in FIG. 17 comprises a transformation block 1801 comprising an input 1803 as well as an output 1805. The output 1805 is coupled to an input of the adaptive subfilter 1807. The adaptive subfilter 1807 has an output 1809 as well as an adaptation input 1811. The output 1809 of the adaptive subfilter 1807 is coupled to an input of a transformation block 1821 having an output 1823. The output 1809 is further connected to a subtracter 1813 having a further input 1815 as well as an output coupled to the adaptation input 1811 of the adaptation subfilter.

Further, the apparatus illustrated in FIG. 17 comprises a transformation block 1817 having an output coupled to the input 1815 of the subtracter 1813. Further, the transformation block 1817 comprises an input 1819 to which advance information is applied.

The advance information can for example be obtained from an estimation of the useful wave field. For example, an estimation of only slowly changing interference wave field is performed in temporal brakes of the useful wave field (source activity detection) in the transformation range. Therefrom, an estimation of the useful wave field in the transformation range is obtained. The structure illustrated in FIG. 17 represents the processing of a single mode. The transformation block 1801 as well as the transformation block 1817 are formed to generate the wave-field components from the applied signals. The (optional) transformation block 1825 is formed to reconstruct the wave field.

FIG. 18 shows an embodiment of a computer program for echo cancellation. According to a further embodiment, an inventive apparatus for suppressing an interference portion in a received signal comprising the interference portion and the useful portion, wherein the received signal can be generated in response to a detectable wave field from receive means disposed at predetermined geometrical positions, wherein the detected wave field is a superposition of a useful wave field and an interference wave field, an apparatus for processing the input signal, wherein the means for providing wave-field components has a selector, which is formed to select wave-field components to be selected due to their spatial, temporal or spectral characteristic, and to provide selected wave-field components to the plurality of single filters, wherein the plurality of single filters is formed to influence the selected wave-field components and to output influenced selected wave-field components as filtered wave-field components, a subtracter coupled to the inventive apparatus for processing the input signal, wherein the subtracter is formed to generate a difference between the wave-field components and the filtered wave-field components as well as the means for determining discrete filter coefficients from the selected wave-field components and the difference, wherein the means for determining discrete filter coefficients is formed to provide the filter coefficients to the plurality of single filters of the apparatus, to filter the selected wave-field components such that the interference portion in the wave-field components provided by the subtracter is suppressed. The wave-field components to be selected can thereby be interference wave-field components or useful wave-field components. Thereby, the interference portion is either suppressed by difference formation or by filtering.

According to a further embodiment, an inventive apparatus for suppressing an interference portion in a received signal comprising the interference portion and the useful portion, wherein the received signal can be generated by receive means disposed at predetermined geometrical positions of a room in response to a detectable wave field, wherein the detectable wave field is a superposition of a useful wave field and an interference wave field, an apparatus for processing the input signal and for providing filtered wave-field components, a selector coupled to the means for determining wave-field components, wherein the selector is formed to select wave-field components to be selected based on spatial, temporal or spectral characteristics from the wave-field components, and to provide selected wave-field components, a subtracter coupled to the apparatus for processing the input signal, wherein the subtracter is formed to generate a difference between the selected wave-field components and the filtered wave-field components, and a means for determining discrete filter coefficients from the wave-field components and the difference, wherein the means for determining discrete filter coefficients is formed to provide the filter coefficients to the plurality of single filters of the apparatus for processing the input signal, and to filter the wave-field components such that the interference portion is suppressed in the wave-field components provided by the subtracter. Thereby, the wave-field components to be selected can be interference wave-field components or useful wave-field components.

Depending on the conditions, the inventive methods can be implemented in hardware. The implementation can be made on a digital memory media, particularly a disc or CD with electronically readable control signals, which can cooperate with a programmable computer system such that the corresponding method is executed. Generally, thus, the invention consists also in a computer program product with a program code stored on a machine-readable carrier for performing the inventive method when the computer program product runs on a computer. In other words, the invention can be realized as a computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for processing an input signal comprising a plurality of subsignals associated to discrete transmitters or discrete receivers, wherein the discrete transmitters or receivers are disposed at predetermined geometrical positions with regard to a room, comprising:
    a provider for providing a plurality of wave-field components from the input signal comprising the plurality of sub-signals, wherein the provider is configured to derive the plurality of wave-field components from the input signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components results in a composite wave-field being propagatable in the room; and
    a plurality of single filters, wherein each single filter of the plurality of single filters is associated to a wave-field component of the plurality of wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered wave-field components representing a processed input signal is obtained as an output, wherein the number of wave field components is merely limited by a spatial sampling theorem rather than by a number of the discrete receivers or a number of the discrete transmitters.

2. The apparatus according to claim 1, wherein the composite wave-field corresponding to the input signal is a sound field, which can be generated by the discrete transmitters at the predetermined geometrical positions, or that can be detected by the discrete receivers at the predetermined geometrical positions, wherein a subsignal comprises a sound pressure or a sound velocity of the sound field at a predetermined geometrical position with regard to the room, wherein the provider is formed to determine the wave-field components from a combination of a quantity based on the sound pressure or a quantity based on the sound velocity with the orthogonal wave-field base functions.

3. The apparatus according to claim 2, wherein the provider for providing the plurality of wave-field components comprises a transformer for generating a spatial Fourier transform of the sound pressure as the quantity based on the sound pressure or for generating a spatial Fourier transform of the sound velocity as the quantity based on the sound velocity.

4. The apparatus according to claim 1, wherein the provider for providing the plurality of wave-field components further comprises a further provider for providing discrete function values, which is formed to provide discrete function values of the orthogonal wave-field base functions.

5. The apparatus according to claim 4, wherein the further provider for providing discrete function values comprises a memory wherein the discrete function values can be stored.

6. The apparatus according to claim 1, wherein each single filter of the plurality of single filters comprises discrete filter coefficients, wherein each single filter of the plurality of single filters is formed to receive the discrete filter coefficients for filtering the associated wave-field component.

7. The apparatus according to claim 1, further comprising a determiner for determining discrete filter coefficients, wherein the determiner for determining the discrete filter coefficients is formed to receive a difference wave-field component for each single filter and to determine the discrete filter coefficients by minimizing a difference between a reference wave-field component and the wave-field component.

8. The apparatus according to claim 7, wherein the determiner is formed to determine the discrete filter coefficients adaptively in the time or frequency domain based on one of the following algorithms: MSE algorithm (MSE=mean-squared error), MMSE algorithm (MMSE=minimum mean-squared error), LMS algorithm (LMS=least mean-square), RLS algorithm (RLS=recursive least-squares), FDAF algorithm (FDAF=frequency-domain adaptive filtering), affine projection algorithm, Newton algorithm, NLMS algorithm (NLMS=normalized LMS).

9. The apparatus according to claim 1, further comprising a reconstructor to obtain a reconstructed wave-field, wherein the reconstructor is formed to reconstruct a filtered wave-field by superposing quantities based on the filtered wave-field components, and to provide the processed input signal in response to which the reconstructed wave-field can be generated by the plurality of discrete transmitters.

10. The apparatus according to claim 9, wherein the reconstructor is formed to reconstruct the filtered wave-field by a Fourier-based transform of the wave-field components.

11. An apparatus for detecting a transmission characteristic of a room during propagation of a transmit wave-field, wherein the wave-field can be generated by discrete transmitters disposed at predetermined geometrical positions of the room in response to an input signal, wherein a receive wave-field can be detected by receivers disposed at predetermined geometrical positions of the room, wherein the receivers generate an output signal in response to the receive wave-field, comprising:

a generator for generating a copy of the input signal;

a provider for providing a plurality of wave-field components of the receive wave-field from the output signal;

a provider for providing a plurality of wave-field components of the copy of the input signal resulting in a composite wave-field corresponding to the copy of the input signal, wherein the plurality of wave-field components of the copy of the input signal is derived from the input signal by a wave-field decomposition based on orthogonal wave-field base functions and the predetermined geometrical positions using a transform causing an orthogonalization of the spatial and temporal components;

a plurality of single filters, wherein each single filter of the plurality of single filters is associated to a wave-field component of the plurality of wave-field components of the copy of the input signal, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered wave-field components representing a filtered copy of the input signal is obtained, wherein the number of wave field components is merely limited by a spatial sampling theorem rather than by a number of the discrete receivers or a number of the discrete transmitters;

a subtractor for generating a plurality of difference wave-field components from a difference between the plurality of filtered wave-field components and the plurality of wave-field components of the receive wave-field;

a determiner for determining discrete filter coefficients coupled to the plurality of single filters, wherein the determiner for determining discrete filter coefficients is formed to adaptively determine the discrete filter coefficients from the plurality of difference wave-field components and the plurality of wave-field components derived from the copy of the input signal, and to provide the discrete filter coefficients to the plurality of single filters, wherein the discrete filter coefficients are the detected transmission characteristic of the room.

12. The apparatus according to claim 11, further comprising a reconstructor for reconstructing a reconstruction wave-field from the plurality of difference wave-field components, wherein the reconstruction wave-field is less influenced by the input signal than the receive wave-field.

13. An apparatus for actively suppressing interferences in a first receive wave-field using a filtered excitation signal, in response to which a plurality of discrete transmitters disposed at geometrical transmitter positions of a room generate an excitation wave-field, which propagates in the room, wherein the first receive wave-field can be detected by a first plurality of discrete receivers disposed at first predetermined geometrical receiver positions of the room, wherein a second receive wave-field can be detected by a second plurality of discrete receivers disposed at second predetermined geometrical receiver positions of the room, wherein the plurality of first discrete receivers provide a first output signal in response to the first receive wave-field, and wherein the plurality of second discrete receivers provide a second output signal in response to the second receive wave-field, comprising:

a provider for providing a plurality of wave-field components of the first output signal resulting in a composite wave-field corresponding to the first output signal, wherein the plurality of wave-field components is derived from the first output signal by a wave-field decomposition based on orthogonal wave-field base functions and the first predetermined geometrical positions using a transform causing an orthogonalization of the spatial and temporal components;

a plurality of single filters, wherein each single filter of the plurality of single filters is associated to a wave-field component of the plurality of wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered wave-field components representing a filtered excitation signal is obtained, wherein the number of wave field components is merely limited by a spatial sampling theorem rather than by a number of the discrete receivers or a number of the discrete transmitters;

a reconstructor for reconstructing the excitation wave-field from the filtered wave-field components representing the filtered excitation signal and for providing the filtered excitation signal to the discrete transmitters;

a provider for providing a plurality of wave-field components of the second receive wave-field;

a determiner for determining discrete filter coefficients, the determiner being coupled to the plurality of single filters, wherein the determiner is formed to adaptively determine the discrete filter coefficients from the plurality of wave-field components of the first receive wave-field and the plurality of wave-field components of the second receive wave-field to suppress the interferences in the first receive wave-field by filtering the plurality of wave-field components of the first output signal representing the first receive wave-field.

14. An apparatus for detecting an inverse transmission characteristic of a room during propagation of a generate wave-field, wherein the generate wave-field can be generated by discrete transmitters disposed at predetermined geometrical positions in the room in response to an input signal, wherein a receive wave-field can be detected by discrete receivers disposed at predetermined geometrical positions of the room, wherein the discrete receivers generate an output signal in response to the receive wave-field, comprising:

a generator for generating a copy of the input signal;

a delay element for delaying the copy of the input signal;

a provider for providing a plurality of wave-field components from the delayed copy of the input signal as reference wave-field components;

a provider for providing a plurality of wave-field components of the output signal, wherein the plurality of wave-field components of the output signal is derived from the output signal by a wave-field decomposition based on orthogonal wave-field base functions and the predetermined geometrical positions using a transform causing an orthogonalization of the spatial and temporal components;

a plurality of single filters, wherein each single filter of the plurality of single filters is associated to a wave-field component of the plurality of wave-field components of the output signal, wherein a filtering of the wave field components separately from each other is obtained, wherein each wave field component is filtered by the single filter associated with the respective wave field component, and wherein each single filter of the plurality of single filters is formed to influence the associated wave-field component of the output signal such that with regard to the plurality of single filters, a plurality of filtered wave-field components representing a filtered output signal is obtained, wherein the number of wave field components is merely limited by a spatial sampling theorem rather than by a number of the discrete receivers or a number of the discrete transmitters;

a subtractor, which is formed to generate a plurality of difference wave-field components from a difference between the filtered wave-field components and the delayed wave-field components;

a determiner for determining discrete filter coefficients, coupled to the plurality of single filters wherein the determiner is formed to adaptively determine the discrete filter coefficients from the plurality of difference wave-field components and the plurality of wave-field components of the output signal representing the receive wave-field, and to provide the discrete filter coefficients to the plurality of single filters wherein the discrete filter coefficients are the detected inverse transmission characteristic of the room.

15. An apparatus for generating a prediction error signal from an input signal, wherein the input signal has an information portion and a redundancy portion, and wherein the prediction error signal comprises the information portion, wherein a generate wave-field can be generated by discrete transmitters disposed at predetermined geometrical positions of a room in response to the prediction error signal, comprising:

a generator for generating a copy of the input signal;

a provider for providing a plurality of wave-field components from the input signal;

a delay element for delaying the copy of the input signal or a plurality of wave-field components of the copy of the input signal;

a provider for providing a plurality of wave-field components of the copy or the delayed copy of the input signal wherein the plurality of wave-field components is derived from the copy or the delayed copy of the input signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components of the copy or the delayed copy of the input signal results in a composite wave-field;

a plurality of single filters, wherein each single filter of the plurality of single filters is associated to a wave-field component of the plurality of wave-field components of the copy or the delayed copy of the input signal, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered wave-field components representing a filtered copy or filtered delayed copy of the input signal is obtained, wherein the number of wave field components is merely limited by a spatial sampling theorem rather than by a number of the discrete receivers or a number of the discrete transmitters, a subtractor formed to generate a plurality of difference wave-field components from a difference between the plurality of wave-field components of the input signal and the plurality of filtered wave-field components;

a determiner for determining discrete filter coefficients, wherein the determiner for determining discrete filter coefficients is coupled to a plurality of single filters wherein the determiner is formed to provide the discrete filter coefficients from the plurality of difference wave-field components and the plurality of wave-field components associated to the copy or the delayed copy of the input signal, to generate the prediction error signal by suppressing the redundancy portion during filtering, wherein the plurality of filtered wave-field components is the prediction error signal.

16. An apparatus for retrieving a useful signal from an input signal, wherein the useful signal comprises an information portion and a redundancy portion, wherein the useful signal comprises a plurality of wave-field components of a wave-field, wherein the redundancy portion can be suppressed by filtering the plurality of wave-field components, wherein the plurality of filtered wave-field components results in a prediction error signal, in response to which an output wave-field can be generated by discrete transmitters disposed at predetermined geometrical positions of a room, wherein the output wave-field can be propagated in the room, wherein a receive wave-field can be detected by a plurality of discrete receivers disposed at predetermined geometrical positions of the room, wherein the discrete receivers generate the input signal in response to the receive wave-field, comprising:

a provider for providing the discrete filter coefficients;

a provider for providing a plurality of wave-field components of the input signal, wherein the plurality of wave-field components is derived from the input signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components of the input signal results in a composite wave-field;

a adder, which is formed to add the plurality of wave-field components of the input signal and a plurality of filtered wave-field components to obtain a plurality of added wave-field components of the input signal;

a plurality of single filters, wherein each single filter of the plurality of single filters is associated to an added wave-field component of the plurality of added wave-field components of the input signal, wherein a filtering of the wave field components separately from each other is obtained, wherein each wave field component is filtered by the single filter associated with the respective wave field component, and wherein each single filter of the plurality of single filters is formed to influence the added wave-field component such that with regard to the plurality of single filters, a plurality of filtered wave-field components representing a filtered input signal is obtained, wherein the number of wave field components is merely limited by a spatial sampling theorem rather than by a number of the discrete receivers or a number of the discrete transmitters, and wherein the plurality of added wave-field components is the retrieved useful signal.

17. An apparatus for suppressing an interference portion in a received signal comprising the interference portion and a useful portion, wherein the received signal can be generated by discrete receivers disposed at predetermined geometrical positions of a room in response to a detectable wave-field, wherein the detectable wave-field is a superposition of a useful wave-field and an interference wave-field, comprising:

a provider for providing a plurality of wave-field components of the received signal, wherein the plurality of wave-field components is derived from the received signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components results in a composite wave-field;

a selector formed to select wave-field components based on the spatial, temporal or spectral characteristic, and to provide a plurality of selected wave-field components;

a plurality of single filters, wherein each single filter of the plurality of single filters is associated to a selected wave-field component of the plurality of selected wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of influenced selected wave-field components as a plurality of filtered wave-field components is obtained, wherein the number of wave field components is merely limited by a spatial sampling theorem rather than by a number of the discrete receivers or a number of the discrete transmitters, a subtractor coupled to the plurality of single filters wherein the subtractor is formed to generate a plurality of difference wave-field components between the plurality of wave-field components and the plurality of filtered wave-field components;

a determiner for determining discrete filter coefficients from the plurality of selected wave-field components and the plurality of difference wave-field components and for providing the filter coefficients to the plurality of single filters wherein the plurality of selected wave-field components are filtered such that the interference portion in the plurality of difference wave-field components is suppressed.

18. The apparatus for suppressing an interference portion according to claim 17, wherein the wave-field components selected by the selector are interference wave-field components or useful wave-field components.

19. The apparatus for suppressing an interference portion according to claim 17, further comprising a further selector, wherein the further selector is formed to select further wave-field components based on the spatial, temporal or spectral characteristic, and to provide a plurality of further selected wave-field components.

20. The apparatus for suppressing an interference portion according to claim 19, wherein the plurality of further selected wave-field components are useful wave-field components or interference wave-field components.

21. An apparatus for suppressing an interference portion in a received signal comprising an interference portion and a useful portion, wherein the received signal can be generated by discrete receivers disposed at predetermined geometrical positions of a room in response to a detectable wave-field, wherein the detectable wave-field is a superposition of a useful wave-field and an interference wave-field, comprising:

a provider for providing a plurality of wave-field components of the received signal, wherein the plurality of wave-field components is derived from the received signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components results in a composite wave-field;

a plurality of single filters, wherein each single filter of the plurality of single filters is associated to a wave-field component of the plurality of wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of influenced wave-field components as filtered wave-field components is obtained, wherein the number of wave field components is merely limited by a spatial sampling theorem rather than by a number of the discrete receivers or a number of the discrete transmitters, a selector coupled to the determiner, wherein the selector is formed to select wave-field components based on a spatial, temporal or spectral characteristic from the wave-field components, and to output the selected wave-field components;

a subtractor coupled to the plurality of single filters, wherein the subtractor is formed to generate a plurality of difference wave-field components between the selected wave-field components and the filtered wave-field components;

a determiner for determining discrete filter coefficients from the wave-field components and the plurality of difference wave-field components, wherein the determiner for determining is formed to provide the filter coefficients to the plurality of single filters to filter the wave-field components such that the interference portion in the plurality of difference wave-field components is suppressed.

22. The apparatus for suppressing an interference portion in a received signal according to claim 21, wherein the wave-field components selected by the selector are interference wave-field components or useful wave-field components.

23. A method for processing an input signal comprising a plurality of subsignals associated to discrete transmitters or discrete receivers disposed at predetermined geometrical positions of a room, comprising:

providing a plurality of wave-field components, wherein the plurality of wave-field components is derived from the input signal by a wave-field decomposition based on orthogonal wave-field base functions and the predetermined geometrical positions with regard to the room using a transform causing an orthogonalization of the spatial and temporal components, wherein the wave-field decomposition is such that a superposition of the plurality of wave-field components results in a composite wave-field propagatable in the room; and filtering the plurality of wave-field components using a plurality of single filters such that a plurality of filtered wave-field components representing a processed input signal is obtained as an output wherein a filtering of the wave field components separately from each other is obtained, wherein each wave field component is filtered by the single filter associated with the respective wave field component, and wherein the number of wave field components is merely limited by a spatial sampling theorem rather than by a number of the discrete receivers or a number of the discrete transmitters.

24. A method for detecting a transmission characteristic of a room during propagation of a transmit wave-field, wherein the wave-field can be generated by discrete transmitters disposed at predetermined geometrical positions in the room in response to an input signal, and wherein a receive wave-field can be detected by receivers disposed at predetermined geometrical positions, wherein the receivers generates an output signal in response to a receive wave-field, comprising:

generating a copy of the input signal;

providing a plurality of wave-field components of the receive wave-field from the output signal;

providing a plurality of wave-field components of the copy of the input signal resulting in a composite wave-field corresponding to the copy of the input signal, wherein the plurality of wave-field components of the copy of the input signal is derived from the input signal by a wave-field decomposition based on orthogonal wave-field base functions at predetermined geometrical positions using a transform causing an orthogonalization of the spatial and temporal components; and filtering wave-field components by a plurality of filters, wherein each single filter of the plurality of single filters is associated to a wave-field component of the plurality of wave-field components of the copy of the input signal, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered wave-field components representing a filtered copy of the input signal is obtained, wherein the number of wave field components is merely limited by a spatial sampling theorem rather than by a number of the discrete receivers or a number of the discrete transmitters, forming a plurality of difference wave-field components from a difference between the plurality of filtered wave-field components and the plurality of wave-field components of the receive wave-field;

determining discrete filter coefficients from the plurality of difference wave-field components and the plurality of wave-field components derived from the copy of the input signal, wherein the discrete filter coefficients are determined adaptively;

using the adaptively determined discrete filter coefficients for filtering the plurality of wave-field components of the copy of the input signal, wherein the discrete filter coefficients are the detected transmission characteristic of the room.

25. A method for actively suppressing interferences in a first receive wave-field using a filtered excitation signal, in response to which a plurality of discrete transmitters disposed at predetermined geometrical transmitter positions of a room generate an excitation wave-field, which can be propagated in the room, wherein the first receive wave-field can be detected by a first plurality of discrete receivers disposed at first predetermined geometrical receiver positions of the room, wherein a second receive wave-field can be detected by a second predetermined geometrical receiver positions of the room, wherein the first discrete receivers provide a first output signal in response to the first receive wave-field, and wherein the second discrete receivers provide a second output signal in response to the second receive wave-field, comprising:

providing a plurality of wave-field components of the first output signal resulting in a composite wave-field corresponding to the first output signal, wherein the plurality of wave-field components is derived from the first output signal by a wave-field decomposition based on orthogonal wave-field base functions and the first predetermined geometrical positions using a transform causing an orthogonalization of the spatial and temporal components; and filtering wave-field components by a plurality of single filters, wherein each single filter of the plurality of single filters is associated to a wave-field component of the plurality of wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered wave-field components representing a filtered excitation signal is obtained, wherein the number of wave field components is merely limited by a spatial sampling theorem rather than by a number of the discrete receivers or a number of the discrete transmitters, reconstructing the excitation wave-field from the filtered wave-field components representing the filtered excitation signal and providing the a filtered excitation signal to the discrete transmitters;

providing a plurality of wave-field components of the second receive wave-field;

receiving the wave-field components of the second wave-field;

determining discrete filter coefficients from the plurality of wave-field components of the first receive wave-field and the plurality of wave-field components of the second receive wave-field, wherein the filter coefficients are determined adaptively;

filtering the plurality of wave-field components of the first output signal representing the first receive wave-field using the adaptively determined filter coefficients to suppress the interferences in the first receive wave-field.

26. A method for detecting an inverse transmission characteristic of a room during propagation of a generate wave-field, wherein the generate wave-field can be generated by discrete transmitters disposed at predetermined geometrical positions in the room in response to an input signal, wherein a receive wave-field can be detected by discrete receivers disposed at predetermined geometrical positions of the room, wherein the discrete receivers generate an output signal in response to the receive wave-field, comprising:

generating a copy of the input signal;
delaying the copy of the input signal;
providing a plurality of wave-field components from the delayed copy of the input signal as reference wave-field components;
providing a plurality of wave-field components of the output signal, wherein the plurality of wave-field components of the output signal is derived from the output signal by a wave-field decomposition based on orthogonal wave-field base functions and the predetermined geometrical positions using a transform causing an orthogonalization of the spatial and temporal components; and
filtering wave-field components by a plurality of single filters, wherein each single filter of the plurality of single filters is associated to a wave-field component of the plurality of wave-field components of the output signal, wherein a filtering of the wave field components separately from each other is obtained, wherein each wave field component is filtered by the single filter associated with the respective wave field component, and wherein each single filter of the plurality of single filters is formed to influence the associated wave-field component of the output signal such that with regard to the plurality of single filters a plurality of filtered wave-field components representing a filtered output signal is obtained, wherein the number of wave field components is merely limited by a spatial sampling theorem rather than by a number of the discrete receivers or a number of the discrete transmitters, forming a plurality of difference wave-field components between the filtered wave-field components and the delayed wave-field components;

determining discrete filter coefficients coupled to the plurality of single filters from the plurality of difference wave-field components and the plurality of wave-field components of the output signal representing the receive wave-field, wherein the filter coefficients are determined adaptively;

filtering the plurality of wave-field components by the plurality of single filters using the adaptively determined filter coefficients;

wherein the discrete filter coefficients are the detected inverse transmission characteristic of the room.

27. A method for generating a prediction error signal from an input signal, wherein the input signal comprises an information portion and a redundancy portion, and wherein the prediction error signal comprises the information portion, wherein a generate wave-field can be generated by discrete transmitters disposed at predetermined geometrical positions of a room in response to the prediction error signal, comprising:

generating a copy of the input signal;
providing a plurality of wave-field components from the input signal;
delaying the copy of the input signal or a plurality of wave-field components of the copy of the input signal;
providing a plurality of wave-field components of the copy or the delayed copy of the input signal wherein the plurality of wave-field components is derived from the copy or the delayed copy of the input signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components of the copy or the delayed copy of the input signal results in a composite wave-field; and filtering wave-field components derived from the copy or the delayed copy of the input signal by a plurality of single filters, wherein each single filter of the plurality of single filters is associated to a wave-field component of the plurality of wave-field components of the copy or the delayed copy of the input signal, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters a plurality of filtered wave-field components representing a filtered copy or filtered delayed copy of the input signal is obtained, wherein the number of wave field components is merely limited by a spatial sampling theorem rather than by a number of the discrete receivers or a number of the discrete transmitters, forming a difference between the plurality of wave-field components of the input signal and the plurality of filtered wave-field components to obtain a plurality of difference wave-field components;

determining discrete filter coefficients coupled to the single filters from the plurality of wave-field components associated to the copy or the delayed copy of the input signal and from the difference wave-field components;

generating a prediction error signal by suppressing the redundancy portion during filtering the wave-field components derived from the copy or the delayed copy of the input signal by using the discrete filter coefficients, wherein the prediction signal is the plurality of filtered wave-field components.

28. A method for retrieving a useful signal from an input signal, wherein the useful signal comprises an information portion and a redundancy portion, wherein the useful signal comprises a plurality of wave-field components of a wave-field, wherein the redundancy portion can be suppressed by filtering the plurality of wave-field components, wherein the plurality of filtered wave-field components results in a prediction error signal, in response to which an output wave-field can be generated by discrete transmitters disposed at predetermined geometrical positions of a room, wherein the output wave-field can be propagated in the room, wherein a receive wave-field can be detected by a plurality of discrete receivers disposed at predetermined geometrical positions of the room, wherein the discrete receivers generate the input signal in response to the receive wave-field, comprising:
providing the discrete filter coefficients;
providing a plurality of wave-field components of the input signal, wherein the plurality of wave-field components is derived from the input signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components of the input signal results in a composite wave-field;
forming a sum between the plurality of wave-field components of the input signal and a plurality of filtered wave-field components to obtain a plurality of added wave-field components of the input signal;
filtering wave-field components using a plurality of single filters, wherein a filtering of the wave field components separately from each other is obtained, wherein each wave field component is filtered by the single filter associated with the respective wave field component, wherein each single filter of the plurality of single filters is associated to an added wave-field component of the plurality of added wave-field components of the input signal, and wherein each single filter of the plurality of single filters is formed to influence the added wave-field component such that with regard to the plurality of single filters, a plurality of filtered wave-field components representing a filtered input signal is obtained, wherein the number of wave field components is merely limited by a spatial sampling theorem rather than by a number of the discrete receivers or a number of the discrete transmitters;
filtering the plurality of added wave-field components by the plurality of single filters using the discrete filter coefficients, wherein the plurality of added wave-field components is the retrieved useful signal.

29. A method for suppressing an interference portion in a received signal comprising the interference portion and a useful portion, wherein the received signal can be generated by discrete receivers disposed at predetermined geometrical positions in response to a detectable wave-field, wherein the detectable wave-field is a superposition of a useful wave-field and an interference wave-field, wherein the interference wave-field is associated to a further geometrical position of the room,:
providing a plurality of wave-field components of the received signal, wherein the plurality of wave-field components is derived from the received signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components results in a composite wave-field;
selecting interference wave-field components based on a spatial, temporal or spectral characteristic from the plurality of wave-field components of the received signal to provide a plurality of selected interference wave-field components;
filtering the selected interference wave-field components using a plurality of single filters, wherein each single filter of the plurality of single filters is associated to a selected wave-field component of the plurality of selected wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of filtered interference wave-field components is obtained, wherein the number of wave field components is merely limited by a spatial sampling theorem rather than by a number of the discrete receivers or a number of the discrete transmitters;
forming a difference between the plurality of wave-field components and the plurality of filtered interference wave-field components to suppress the interference portion in the wave-field components;
determining discrete filter coefficients from the plurality of selected interference wave-field components and the plurality of difference wave-field components;
filtering the plurality of wave-field components by using the discrete filter coefficients to suppress the interference portion in the plurality of difference wave-field components.

30. A method for suppressing an interference portion in a received signal comprising an interference portion and a useful portion, wherein the received signal can be generated by discrete receivers disposed at predetermined geometrical positions in a room in response to a detectable wave-field, wherein the detectable wave-field is a superposition of a useful wave-field and an interference wave-field, comprising:
providing a plurality of wave-field components of the received signal wherein the plurality of wave-field components is derived from the received signal by a wave-field decomposition based on orthogonal wave-field base functions and the predetermined geometrical positions using a transform causing an orthogonalization of the spatial and temporal components, wherein the wave-field decomposition is such that a superposition of the plurality of wave-field components results in a composite wave-field; and
filtering wave-field components by a plurality of single filters, wherein each single filter of the plurality of single filters is associated to a wave-field component of the plurality of wave-field components, wherein a filtering of the wave field components separately from each other is obtained, wherein each wave field component is filtered by the single filter associated with the respective wave field component, and wherein each single filter of the plurality of single filters is formed to influence the associated wave-field component such that with regard to the plurality of single filters, a plurality of influenced wave-field components as filtered wave-field components is obtained, wherein the number of wave field components is merely limited by a spatial sampling theorem rather than by a number of the discrete receivers or a number of the discrete transmitters, selecting wave-field components based on a spatial, temporal or spectral characteristic from the wave-field components;

forming a plurality of difference wave-field components between the plurality of selected wave-field components and the plurality of filtered wave-field components;

determining discrete filter coefficients from the wave-field components and the plurality of difference wave-field components;

filtering the wave-field components by using the discrete filter coefficients to suppress the interference portion in the plurality of difference wave-field components.

31. A computer readable non-transitory medium having stored thereon a computer program with a program code for performing a method for processing an input signal comprising a plurality of subsignals associated to discrete transmitters or discrete receivers disposed at predetermined geometrical positions of a room, the method comprising:

providing a plurality of wave-field components, wherein the plurality of wave-field components is derived from the input signal by a wave-field decomposition based on orthogonal wave-field base functions and the predetermined geometrical positions with regard to the room using a transform causing an orthogonalization of the spatial and temporal components, wherein the wave-field decomposition is such that a superposition of the plurality of wave-field components results in a composite wave-field propagatable in the room; and filtering the plurality of wave-field components using single filters, such that a plurality of filtered wave-field components representing a processed input signal is obtained as an output, wherein a filtering of the wave field components separately from each other is obtained, wherein each wave field component is filtered by the single filter associated with the respective wave field component, and wherein the number of wave field components is merely limited by a spatial sampling theorem rather than by a number of the discrete receivers or a number of the discrete transmitters, when the program runs on a computer.

* * * * *